US012701571B2

(12) United States Patent
Zhang et al.

(10) Patent No.: US 12,701,571 B2
(45) Date of Patent: Aug. 4, 2026

(54) METHOD AND APPARATUS FOR TRANSCEIVING DATA AND CONTROL INFORMATION IN WIRELESS COMMUNICATION SYSTEM

(71) Applicant: SAMSUNG ELECTRONICS CO., LTD., Suwon-si (KR)

(72) Inventors: Sa Zhang, Beijing (CN); Feifei Sun, Beijing (CN); Min Wu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 616 days.

(21) Appl. No.: 17/935,460

(22) Filed: Sep. 26, 2022

(65) Prior Publication Data

US 2023/0097059 A1     Mar. 30, 2023

(30) Foreign Application Priority Data

Sep. 28, 2021   (CN) .......................... 202111142569.8
Oct. 29, 2021   (CN) .......................... 202111275368.5

(51) Int. Cl.
| | |
|---|---|
| *H04W 72/12* | (2023.01) |
| *H04L 1/18* | (2023.01) |
| *H04L 1/1812* | (2023.01) |
| *H04W 72/1273* | (2023.01) |
| *H04W 72/23* | (2023.01) |

(52) U.S. Cl.
CPC ....... *H04W 72/1273* (2013.01); *H04L 1/1812* (2013.01); *H04W 72/23* (2023.01)

(58) Field of Classification Search
CPC ............. H04W 72/1273; H04W 72/23; H04W 72/231; H04W 72/232; H04L 1/1812; H04L 1/1864; H04L 1/0026; H04L 1/16711; H04L 1/614; H04L 1/1822; H04L 1/1854; H04L 2001/0093; H04L 5/0055; H04L 5/1469
USPC ..................................... 370/329–330
See application file for complete search history.

(56) References Cited

U.S. PATENT DOCUMENTS

| | | | |
|---|---|---|---|
| 2018/0007667 A1* | 1/2018 | You ........................ | H04L 5/0051 |
| 2020/0106568 A1 | 4/2020 | Tsai et al. | |
| 2022/0045805 A1* | 2/2022 | Karaki .................. | H04L 1/1864 |
| 2023/0076459 A1* | 3/2023 | Si ........................ | H04W 72/1273 |
| 2023/0145930 A1* | 5/2023 | Park ....................... | H04L 1/1812 |
| | | | 370/329 |
| 2023/0198679 A1* | 6/2023 | Bae ....................... | H04L 5/0055 |
| | | | 370/329 |

(Continued)

OTHER PUBLICATIONS

Samsung, "PDSCH/PUSCH enhancements for NR from 52.6 GHz to 71 Ghz," 3GPP TSG RAN WG1 #107-e, R1-2111728, e-Meeting, Nov. 11-19, 2021, 18 pages.

(Continued)

*Primary Examiner* — Candal Elpenord

(57) ABSTRACT

The disclosure relates to a 5G or 6G communication system for supporting a higher data transmission rate. The disclosure discloses a method performed by a user equipment (UE) in a wireless communication system and a UE performing the method. The method comprises receiving a downlink control information DCI format, wherein the DCI format is used for scheduling one or more uplink channels or downlink channels; and transmitting the one or more uplink channels or receiving the one or more downlink channels according to the DCI format.

16 Claims, 18 Drawing Sheets

(56)     References Cited

U.S. PATENT DOCUMENTS

| 2023/0247627 A1* | 8/2023 | Choi | H04L 1/1854 |
| 2023/0261799 A1* | 8/2023 | Babaei | H04L 1/1861 |
| | | | 370/329 |
| 2023/0275735 A1* | 8/2023 | He | H04L 1/1861 |
| | | | 370/329 |

OTHER PUBLICATIONS

Samsung, "PDSCH/PUSCH enhancements for NR from 52.6 GHz to 71 GHz," 3GPP TSG RAN WG1 #106bis-e, R1-2109480,e-Meeting, Oct. 11-19, 2021, 22 pages.
3GPP TS 38.306 V17.1.0 (Jun. 2022) Technical Specification; 3rd Generation Partnership Project; Technical Specification Group Radio Access Network; NR; User Equipment (UE) radio access capabilities (Release 17); 224 pages.
3GPP TS 38.321 V17.1.0 (Jun. 2022) Technical Specification; 3rd Generation Partnership Project; Technical Specification Group Radio Access Network; NR; Medium Access Control (MAC) protocol specification (Release 17); 238 pages.
3GPP TS 38.213 V17.1.0 (Mar. 2022) Technical Specification; 3rd Generation Partnership Project; Technical Specification Group Radio Access Network; NR; Physical layer procedures for control (Release 17); 245 pages.
3GPP TS 38.214 V17.1.0 (Mar. 2022) Technical Specification; 3rd Generation Partnership Project; Technical Specification Group Radio Access Network; NR; Physical layer procedures for data (Release 17); 225 pages.
Supplementary European Search Report dated Oct. 30, 2023, in connection with European Patent Application No. 22847396.3, 6 pages.
NTT Docomo, Inc., "DL/UL scheduling and HARQ management," 3GPP TSG RAN WG1 Meeting #92, R1-1802487, Athens, Greece, Feb. 26-Mar. 2, 2018, 2 pages.
Cewit et al., "Enhancements of PDSCH/PUSCH Scheduling for 52.6 GHz to 71 GHz Band", 3GPP TSG RAN WG1 #106-e, Aug. 16-27, 2021, R1-2107039, 4 pages.
LG Electronics, "PDSCH/PUSCH enhancements to support NR above 52.6 GHz", 3GPP TSG RAN WG1 #106-e, Aug. 16-27, 2021, R1-2107439, 26 pages.
InterDigital, Inc., "PDSCH/PUSCH Enhancements for Supporting NR from 52.6 GHz to 71 GHz", 3GPP TSG RAN WG1 #106-e, Aug. 16-27, 2021, R1-2106770, 16 pages.
CATT, "PDSCH/PUSCH enhancements for up to 71GHz operation", 3GPP TSG RAN WG1 #106-e, Aug. 16-27, 2021, R1-2106960, 18 pages.
International Search Report dated Jan. 12, 2023 in connection with International Patent Application No. PCT/KR2022/013964, 3 pages.
Written Opinion of the International Searching Authority dated Jan. 12, 2023 in connection with International Patent Application No. PCT/KR2022/013964, 4 pages.
Communication pursuant to Article 94(3) EPC dated Oct. 8, 2025, in connection with European Application No. 22847396.3, 6 pages.

* cited by examiner

116

310    305

330    325

SPEAKER    RX PROCESSING CIRCUITRY    RF TRANSCEIVER 320    315

MICROPHONE    TX PROCESSING CIRCUITRY 345    340    350

I/O IF    PROCESSOR    TOUCHSCREEN

DISPLAY

355

360

MEMORY

OPERATING SYSTEM    361

APPLICATIONS    362

500

S510
RECEIVE DOWNLINK DATA AND/OR DOWNLINK
CONTROL SIGNALLING

S520
DETERMINE UPLINK DATA AND/OR UPLINK CONTROL
SIGNALLING AND UPLINK TIME UNIT ACCORDING TO
DOWNLINK DATA AND/OR DOWNLINK CONTROL
SIGNALLING

S530
TRANSMIT UPLINK DATA AND/OR UPLINK CONTROL
SIGNALLING IN THE UPLINK TIME UNTT

| HARQ-ACK bit index | 0 | 1 | 2 | 3 | 4 | 5 | 6 | 7 |
|---|---|---|---|---|---|---|---|---|
| HARQ-ACK bit meaning | A/N corresponding to SLIV 0 | A/N corresponding to SLIV 1 | NACK | A/N corresponding to SLIV 3 | NACK | A/N corresponding to SLIV 5 | NACK | NACK |

FIG.9A

| HARQ-ACK bit index | 0 | 1 | 2 | 3 | 4 | 5 | 6 | 7 |
|---|---|---|---|---|---|---|---|---|
| HARQ-ACK bit meaning | A/N corresponding to SLIV 0 | A/N corresponding to SLIV 1 | A/N corresponding to SLIV 3 | A/N corresponding to SLIV 5 | NACK | NACK | NACK | NACK |

METHOD AND APPARATUS FOR TRANSCEIVING DATA AND CONTROL INFORMATION IN WIRELESS COMMUNICATION SYSTEM

CROSS-REFERENCE TO RELATED APPLICATIONS

This application is based on and claims priority under 35 U.S.C. § 119 to Chinese Patent Application No. 202111142569.8 filed on Sep. 28, 2021, and Chinese Patent Application No. 202111275368.5 filed on Oct. 29, 2021, in the Chinese Intellectual Property Office, the disclosure of which are incorporated by reference herein in their entirety.

BACKGROUND

1. Field

The disclosure relates to a wireless (or, mobile) communication system. More specifically, the disclosure related to a method and an apparatus for transmitting and receiving data and control information, in particular to the reception/transmission of multiple physical downlink shared channels (PDSCHs)/physical uplink shared channels (PUSCHs) and transmission/reception of a hybrid automatic repeat request (HARQ-ACK) codebook.

2. Description of Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz (THz) bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

Recently, there are needs to enhance current procedures of transmission/reception of PDSCHs and PUSCHs.

SUMMARY

In 5G, a UE can support flexible numerologies, larger bandwidth and more flexible scheduling. When a sub-carrier spacing (SCS) is large, the absolute time of a slot may be small. Slot-based scheduling may cause a large overhead of downlink control information (DCI). In order to reduce the overhead of DCI, a DCI format can be adopted to schedule multiple PDSCHs and/or PUSCHs. How to design the scheduling of multiple PDSCHs and/or PUSCHs and the feedback methods of HARQ-ACK are urgent problems to be solved.

According to an embodiment of the disclosure, a method performed by a user equipment UE in a wireless communication system, comprising: receiving a downlink control information DCI format, wherein the DCI format is used to schedule one or more uplink channels or downlink channels; and transmitting the one or more uplink channels or receiving the one or more downlink channels according to the DCI format.

According to an embodiment of the disclosure, wherein the DCI format includes a time unit interval, which is used to indicate a time unit interval between a specific downlink channel among the one or more downlink channels and an uplink channel associated with the specific downlink channel.

According to the embodiment of the disclosure, wherein the specific downlink channel is the last downlink channel that does not overlap with a first predefined time unit in time domain.

According to an embodiment of the disclosure, the method further comprises: for a serving cell, not receiving a semi-persistent scheduling downlink channel when at least one of the following conditions is satisfied: the UE receives a DCI format, which is used for scheduling multiple downlink channels; the semi-persistent scheduling downlink channel is configured to be received between the first downlink channel and the last downlink channel among the multiple downlink channels scheduled by the DCI format; the semi-persistent scheduling downlink channel is configured to be received between a downlink channel carrying the DCI format and the last downlink channel scheduled by the DCI format; a downlink channel carrying the DCI format and the semi-persistent scheduling downlink channel satisfy that the starting time unit of the downlink channel carrying the DCI format is earlier than the starting time unit of the semi-persistent scheduling downlink channel by N1 time units; a downlink channel carrying the DCI format and the semi-persistent scheduling downlink channel satisfy that the ending time unit of the downlink channel carrying the DCI format is earlier than the ending time unit of the semi-persistent scheduling downlink channel by N1 time units; the semi-persistent scheduling downlink channel overlaps with the multiple downlink channels scheduled by the DCI format in time domain; a hybrid automatic repeat request HARQ process of the semi-persistently scheduling downlink channel is the same as at least one of the HARQ processes of the multiple downlink channels scheduled by the DCI format; the semi-persistent scheduling downlink channel reception and its hybrid automatic repeat request-acknowledgement HARQ-ACK feedback and at least one of the multiple downlink channels scheduled by the DCI format satisfies predefined rules, wherein N1 is a natural number greater than or equal to 1.

According to an embodiment of the disclosure, wherein the predefined rule includes one of the followings: the semi-persistent scheduling downlink channel reception is before at least one downlink channel among the multiple downlink channels scheduled by the DCI format, and a time unit where HARQ-ACK information for the semi-persistent scheduling downlink channel reception is located is after a time unit where HARQ-ACK information for the at least one downlink channel is located; the semi-persistent scheduling downlink channel reception is after at least one downlink channel among the multiple downlink channels scheduled by the DCI format, and a time unit where HARQ-ACK information for the semi-persistent scheduling downlink channel reception is located is before a time unit where HARQ-ACK information for the at least one downlink channel is located.

According to the embodiment of the disclosure, the method further comprises: applying a HARQ process indicated by the DCI format to the first downlink channel; determining a HARQ process of each subsequent downlink channel which does not overlap with the first predefined time unit in time domain according to a scheduled sequence; wherein, determining a HARQ process comprises skipping a HARQ process that satisfies at least one of the following conditions: a HARQ process is configured as a HARQ process available for a semi-persistent scheduling downlink channel configuration; a HARQ process is configured as a first specific HARQ process by higher layer signaling; a HARQ process of a semi-persistent scheduling downlink channel is configured to be received between the first downlink channel and the last downlink channel among the multiple downlink channels scheduled by the DCI format; a HARQ process of a semi-persistent scheduling downlink channel is configured to be received between a downlink channel carrying the DCI format and the last downlink channel scheduled by the DCI format; a HARQ process corresponding to a semi-persistent scheduling downlink channel does not overlap with the multiple downlink channels scheduled by the DCI format in time domain.

According to an embodiment of the disclosure, the method further comprises: determining the number of bits Nharq-ack of a HARQ-ACK codebook for the downlink channels scheduled by the DCI format by one of the following methods: when HARQ-ACK for the downlink channels scheduled by the DCI format is not transmitted in a same time unit as HARQ-ACK indicated by other DCI formats, Nharq-ack is the number of multiple downlink channels multiplied by X; when HARQ-ACK for the downlink channels scheduled by the DCI format is not transmitted in a same time unit as HARQ-ACK indicated by other DCI formats, Nharq-ack is the number of downlink channels among the multiple downlink channels that do not overlap with the first predefined time unit in time domain multiplied by X; wherein X is the number of HARQ-ACK bits corresponding to each downlink channel.

According to the embodiment of the disclosure, the method further comprises: ordering HARQ-ACK information corresponding to the multiple downlink channels scheduled by the DCI format in one of the following methods: arranging the HARQ-ACK information according to a sequence of the multiple downlink channels in time, and if the number of HARQ-ACK bits for the downlink channels among the multiple downlink channels which do not overlap with the first predefined time unit in time domain is less than Nharq-ack-max, padding NACK(s) after the HARQ-ACK bits until the number of HARQ-ACK bits is equal to Nharq-ack-max; arranging the HARQ-ACK information according to a sequence of downlink channels among the multiple downlink channels which do not overlap with the first predefined time unit in time domain in time, if the number of HARQ-ACK bits for the downlink channels among the multiple downlink channels which do not overlap with the first predefined time unit in time domain is less than Nharq-ack-max, padding NACK(s) after the HARQ-ACK bits until the number of HARQ-ACK bits is equal to Nharq-ack-max, wherein Nharq-ack-max is the maximum number of HARQ-ACK bits corresponding to the DCI format.

According to an embodiment of the disclosure, the method further comprises: performing bundling on HARQ-ACK information corresponding to the multiple downlink channels scheduled by the DCI format in time domain by at least one of the following methods: allocating the downlink channels among the multiple downlink channels that do not overlap with the first predefined time unit in time domain into Nb groups, and performing bundling on HARQ-ACK information corresponding to downlink channels in each group, wherein Nb is the number of HARQ-ACK bundling groups corresponding to the DCI format configured for the UE; allocating the multiple downlink channels into Npb groups, and performing bundling on HARQ-ACK information corresponding to downlink channels in each group that do not overlap with the first predefined time unit in time domain, wherein Npb is the maximum number of downlink channels in HARQ-ACK bundling groups corresponding to the DCI format configured for the UE; allocating downlink channels among the multiple downlink channels that do not overlap with the first predefined time unit in time domain to Npb' groups, and performing bundling on HARQ-ACK information corresponding to downlink channels in each group, wherein Npb' is the maximum number of downlink channels in HARQ-ACK bundling groups corresponding to the DCI format configured for the UE.

According to an embodiment of the disclosure, wherein the first predefined time unit is an uplink time unit configured by higher layer signaling.

According to an embodiment of the disclosure, the method further comprises: for a serving cell, not generating media access control packet data unit MAC PDU for a configured grant uplink channel when at least one of the following conditions is satisfied: the UE receives a DCI format scheduling multiple uplink channels; the configured grant uplink channel is configured to be received between the first uplink channel and the last uplink channel among the multiple uplink channels scheduled by the DCI format; the configured grant uplink channel is configured to be received between a downlink channel carrying the DCI format and the last uplink channel scheduled by the DCI format; a downlink channel carrying the DCI format and the configured grant uplink channel satisfy that the starting time unit of the downlink channel carrying the DCI format is earlier than the starting time unit of the configured grant uplink channel by N2 time units; a downlink channel carrying the DCI format and the configured grant uplink channel satisfy that the ending time unit of the downlink channel carrying the DCI format is earlier than the ending time unit of the configured grant uplink channel by N2 time units; the configured grant uplink channel does not overlap with the multiple uplink channels scheduled by the DCI format in time domain; a HARQ process of the configured grant uplink channel is the same as at least one of the HARQ processes of the multiple uplink channels scheduled by the DCI format; wherein N2 is a natural number greater than or equal to 1.

According to the embodiment of the disclosure, the method further comprises: applying a HARQ process indicated by the DCI format to the first uplink channel; determining a HARQ process of each subsequent uplink channel which does not overlap with a second predefined time unit in time domain according to a scheduled sequence; wherein, determining a HARQ process comprises skipping a HARQ process that satisfies at least one of the following conditions: a HARQ process is configured as a HARQ process available for a configured grant uplink channel configuration; a HARQ process is configured as a second specific HARQ process by higher layer signaling; a HARQ process of a configured grant uplink channel is configured to be received between the first uplink channel and the last uplink channel among the multiple uplink channels scheduled by the DCI format; a HARQ process of a configured grant uplink channel is configured to be received between a downlink channel carrying the DCI format and the last uplink channel scheduled by the DCI format; a HARQ process corresponding to a configured grant uplink channel does not overlap with the multiple uplink channels scheduled by the DCI format in time domain.

According to an embodiment of the disclosure, the method further comprises: when an uplink channel carrying uplink control information UCI overlaps with one of the multiple uplink channels scheduled by the DCI format in time domain; if one of the multiple uplink channels is an uplink channel that does not overlap with a second predefined time unit in time domain, multiplexing UCI information in the uplink channel carrying the UCI into the uplink channel that does not overlap with the second predefined time unit in time domain for transmission, and not transmitting the uplink channel carrying the UCI; if one of the multiple uplink channels is an uplink channel that overlaps with the second predefined time unit in time domain, transmitting the uplink channel carrying the UCI.

According to the embodiment of the disclosure, wherein the second predefined time unit includes at least one of the followings: a downlink time unit configured by higher layer signaling; a time unit of a synchronization signal block SSB; a time unit of control resource set CORESET0; an unavailable time unit configured by higher layer signaling; Y time units after the SSB, wherein Y is an integer specified by a protocol and/or configured by higher layer signaling.

According to an embodiment of the disclosure, a method performed by a base station in a wireless communication system is proposed, comprising: transmitting downlink control information (DCI) format, wherein the DCI format is used for scheduling one or more uplink channels or downlink channels; and receiving the one or more uplink channels according to the DCI format.

According to an embodiment of the disclosure, a user equipment UE in a wireless communication system is proposed, comprising: a transceiver configured to transmit and receive signals; and a controller configured to perform the methods according to an embodiment of the disclosure.

According to an embodiment of the disclosure, a base station in a wireless communication system is proposed, comprising: a transceiver configured to transmit and receive signals; and a controller configured to perform the methods according to an embodiment of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

The above and other aspects, features and advantages of the present disclosure will become more apparent from the following detailed description when taken in conjunction with the accompanying drawings.

FIG. 9A illustrates examples of the relationship between HARQ-ACK bit indexes and bit meanings according to various embodiments of the present disclosure;

FIG. 9B illustrates examples of the relationship between HARQ-ACK bit indexes and bit meanings according to various embodiments of the present disclosure;

DETAILED DESCRIPTION

Figure 1:
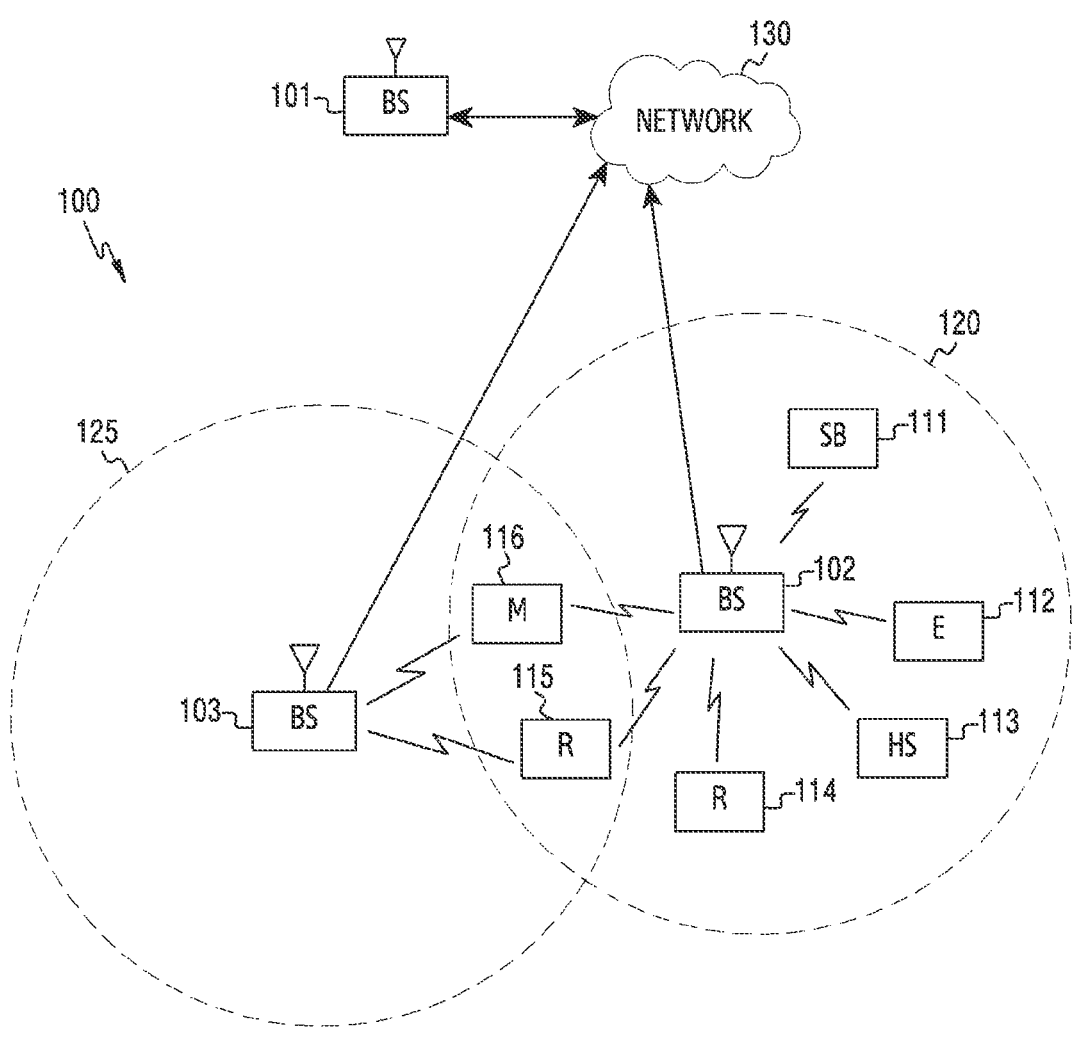
FIG. 1 illustrates a schematic diagram of an example wireless network according to various embodiments of the present disclosure.

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

In order to make the purpose, technical solution and advantages of the embodiments of the disclosure clearer, the technical solution of the embodiments of the disclosure will be clearly and completely described below with reference to the drawings of the embodiments of the disclosure. Obviously, the described embodiments are part of the embodiments of this disclosure, but not all of them. Based on the described embodiments of this disclosure, all other embodiments obtained by those of ordinary skill in the art without creative labor are within the scope of protection of this disclosure.

Before the following description of the specific embodiments, it may be beneficial to clarify the definitions of some words and phrases used throughout this patent document. The term "coupling" and its derivatives refer to any direct or indirect communication between two or more elements, whether or not these elements are in physical contact with each other. The terms "transmitting", "receiving" and "communicating" and their derivatives cover both direct and indirect communication. The terms "including" and "containing" and their derivatives mean including but not limited to. The phrase "associated with," as well as derivatives thereof, means to include, be included within, be connected to, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. For example, "at least one of: A, B, or C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Terms used herein to describe embodiments of the present disclosure are not intended to limit and/or define the scope of the present disclosure. For example, unless otherwise defined, the technical terms or scientific terms used in this disclosure should have the ordinary meanings understood by those of ordinary skill in the art to which the present disclosure belongs.

It should be understood that "first", "second" and similar words used in this disclosure do not indicate any order, quantity or importance, but are only used to distinguish different components. Unless the context clearly indicates otherwise, singular words such as "a", "an" or "the" also do not indicate the quantity limitation, but the existence of at least one.

As used herein, any reference to "one example" or "an example", "one embodiment" or "an embodiment" means that a specific element, feature, structure or characteristic described in connection with the embodiment is included in at least one embodiment. The phrases "in an embodiment" or "in an example" appearing in different locations in the specification do not necessarily all refer to the same embodiment.

It will be further understood that similar words such as the term "including" or "including" mean that the elements or objects appearing before the word cover the listed elements or objects appearing after the word and their equivalents, without excluding other elements or objects. Words like "connect" or "connect . . . with" are not limited to physical or mechanical connections, but can include electrical connections, whether direct or indirect. "Up", "down", "left" and "right" are only used to indicate the relative positional relationship. When the absolute position of the described object changes, the relative positional relationship may also change accordingly.

The various embodiments discussed below for describing the principles of the disclosure in this patent document are for illustration only, and should not be construed as limiting the scope of the disclosure in any way. Those skilled in the art will understand that the principles of the disclosure can be implemented in any suitably arranged wireless communication system. For example, although the following detailed description of the embodiments of the disclosure will focus on LTE and 5G communication systems, those skilled in the art can understand that the main points of the disclosure can also be applied to other communication systems with similar technical backgrounds and channel formats with slight modifications without substantially departing from the scope of the disclosure. The technical solution of the embodiment of the present application can be applied to various communication systems, for example, the communication system can include Global System for Mobile Communications (GSM) system, code division multiple access (CDMA) system, Wideband Code Division Multiple Access (WCDMA) system, general packet radio service (GPRS), long term evolution (LTE) system, LTE frequency division duplex (FDD) system, LTE time division duplex (TDD) system, universal mobile telecommunications system (UMTS) system, worldwide interoperability for microwave access (WiMAX) communication system, 5th generation (5G) system or new radio (NR), etc. In addition, the technical solution of the embodiment of the present application can be applied to future-oriented communication technologies. In addition, the technical solution of the embodiment of the present application can be applied to future-oriented communication technologies.

Hereinafter, embodiments of the disclosure will be explained in detail with reference to the accompanying drawings. It should be noted that the same reference numerals in different drawings will be used to refer to the same elements already described.

The following FIG. 1 to FIG. 3B describe various embodiments implemented by using orthogonal frequency division multiplexing (OFDM) or orthogonal frequency division multiple access (OFDMA) communication technology in a wireless communication system. The descriptions of FIG. 1 to FIG. 3B are not meant to imply the physics or architecture of the ways in which different embodiments can be implemented. The different embodiments of the disclosure can be implemented in any suitably arranged communication system.

FIG. 1 illustrates an example wireless network 100 according to various embodiments of the present disclosure. The embodiment of the wireless network 100 shown in FIG. 1 is for illustration only. Other embodiments of the wireless network 100 can be used without departing from the scope of the disclosure.

The wireless network 100 includes a gNodeB (gNB) 101, a gNB 102, and a gNB 103. gNB 101 communicates with gNB 102 and gNB 103. gNB 101 also communicates with at least one Internet Protocol (IP) network 130, such as the Internet, a private IP network, or other data networks.

Depending on a type of the network, other well-known terms such as "base station" or "access point" can be used instead of "gNodeB" or "gNB." For convenience, the terms "gNodeB" and "gNB" are used in this patent document to refer to network infrastructure components that provide wireless access for remote terminals. And, depending on the type of the network, other well-known terms such as "mobile station," "user station," "remote terminal," "wireless terminal" or "user apparatus" can be used instead of "user equipment" or "UE." For convenience, the terms "user equipment" and "UE" are used in this patent document to refer to remote wireless devices that wirelessly access the gNB, no matter whether the UE is a mobile device (such as a mobile phone or a smart phone) or a fixed device (such as a desktop computer or a vending machine).

A gNB 102 provides wireless broadband access to the network 130 for a first plurality of user equipments (UEs) within a coverage area 120 of the gNB 102. The first plurality of UEs include a UE 111, which may be located in a small business; a UE 112, which may be located in an enterprise (E); a UE 113, which may be located in a WiFi Hotspot (HS); a UE 114, which may be located in a first residence (R); a UE 115, which may be located in a second residence (R); a UE 116, which may be a mobile device (M), such as a cellular phone, a wireless laptop computer, a wireless PDA, etc. A gNB 103 provides wireless broadband access to network 130 for a second plurality of UEs within a coverage area 125 of the gNB 103. The second plurality of UEs include a UE 115 and a UE 116. In some embodiments, one or more of gNBs 101-103 can communicate with each other and with UEs 111-116 using 5G, long term evolution (LTE), LTE-A, WiMAX or other advanced wireless communication technologies.

The dashed lines show approximate ranges of the coverage areas 120 and 125, and the ranges are shown as approximate circles merely for illustration and explanation purposes. It should be clearly understood that the coverage areas associated with the gNBs, such as the coverage areas 120 and 125, may have other shapes, including irregular shapes, depending on configurations of the gNBs and changes in the radio environment associated with natural obstacles and man-made obstacles.

As will be described in more detail below, one or more of a gNB 101, a gNB 102, and a gNB 103 include a 2D antenna array as described in embodiments of the disclosure. In some embodiments, one or more of the gNB 101, the gNB 102, and the gNB 103 support codebook designs and structures for systems with 2D antenna arrays.

Although FIG. 1 illustrates an example of the wireless network 100, various changes can be made to FIG. 1. The wireless network 100 can include any number of gNBs and any number of UEs in any suitable arrangement, for example. Furthermore, a gNB 101 can directly communicate with any number of UEs and provide wireless broadband access to the network 130 for those UEs. Similarly, each gNB 102-103 can directly communicate with the network 130 and provide direct wireless broadband access to the network 130 for the UEs. In addition, the gNB 101, 102 and/or 103 can provide access to other or additional external networks, such as external telephone networks or other types of data networks.

Figure 2A:
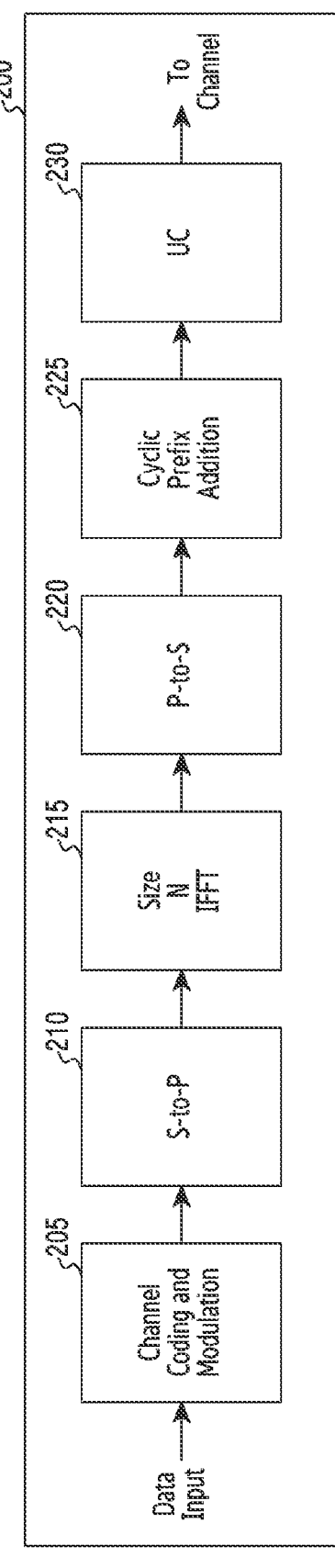
FIG. 2A illustrates example wireless transmission and reception paths according to various embodiments of the present disclosure.
Figure 2B:
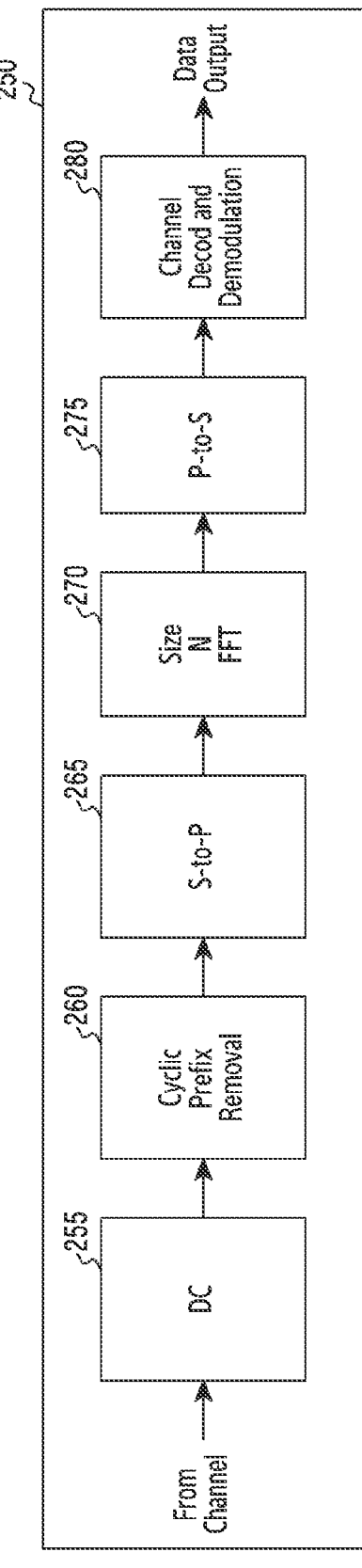
FIG. 2B illustrates example wireless transmission and reception paths according to various embodiments of the present disclosure.

FIGS. 2A and 2B illustrate example wireless transmission and reception paths according to the disclosure. In the following description, the transmission path 200 can be described as being implemented in a gNB, such as the gNB 102, and the reception path 250 can be described as being implemented in a UE, such as UE 116. However, it should be understood that the reception path 250 can be implemented in a gNB and the transmission path 200 can be implemented in a UE. In some embodiments, the reception path 250 is configured to support codebook designs and structures for systems with 2D antenna arrays as described in embodiments of the disclosure.

The transmission path 200 includes a channel coding and modulation block 205, a serial-to-parallel (S-to-P) block 210, a size N inverse fast Fourier transform (IFFT) block 215, a parallel-to-serial (P-to-S) block 220, a cyclic prefix addition block 225, and an up-converter (UC) 230. The reception path 250 includes a down-converter (DC) 255, a cyclic prefix removal block 260, a serial-to-parallel (S-to-P) block 265, a size N fast Fourier transform (FFT) block 270, a parallel-to-serial (P-to-S) block 275, and a channel decoding and demodulation block 280.

In the transmission path 200, the channel coding and modulation block 205 receives a set of information bits, applies coding (such as low density parity check (LDPC) coding), and modulates the input bits (such as using quadrature phase shift keying (QPSK) or quadrature amplitude modulation (QAM)) to generate a sequence of frequency-domain modulated symbols. The serial-to-parallel (S-to-P) block 210 converts (such as demultiplexes) serial modulated symbols into parallel data to generate N parallel symbol streams, where N is a size of the IFFT/FFT used in the gNB 102 and the UE 116. The size N IFFT block 215 performs IFFT operations on the N parallel symbol streams to generate a time-domain output signal. The parallel-to-serial block 220 converts (such as multiplexes) parallel time-domain output symbols from the Size N IFFT block 215 to generate a serial time-domain signal. The cyclic prefix addition block 225 inserts a cyclic prefix into the time-domain signal. The up-converter 230 modulates (such as up-converts) the output of the cyclic prefix addition block 225 to an RF frequency for transmission via a wireless channel. The signal can also be filtered at a baseband before switching to the RF frequency.

The RF signal transmitted from the gNB 102 arrives at the UE 116 after passing through the wireless channel, and operations in reverse to those at the gNB 102 are performed at the UE 116. The down-converter 255 down-converts the received signal to a baseband frequency, and the cyclic prefix removal block 260 removes the cyclic prefix to generate a serial time-domain baseband signal. The serial-to-parallel block 265 converts the time-domain baseband signal into a parallel time-domain signal. The size N FFT block 270 performs an FFT algorithm to generate N parallel frequency-domain signals. The parallel-to-serial block 275 converts the parallel frequency-domain signal into a sequence of modulated data symbols. The channel decoding and demodulation block 280 demodulates and decodes the modulated symbols to recover the original input data stream.

Each of gNBs 101-103 may implement a transmission path 200 similar to that for transmitting to the UEs 111-116 in the downlink, and may implement a reception path 250 similar to that for receiving from the UEs 111-116 in the uplink. Similarly, each of UEs 111-116 may implement a transmission path 200 for transmitting to the gNBs 101-103 in the uplink, and may implement a reception path 250 for receiving from the gNBs 101-103 in the downlink.

Each of the components in FIGS. 2A and 2B can be implemented using only hardware, or using a combination of hardware and software/firmware. As a specific example, at least some of the components in FIGS. 2A and 2B may be implemented in software, while other components may be implemented in configurable hardware or a combination of software and configurable hardware. For example, the FFT block 270 and IFFT block 215 may be implemented as configurable software algorithms, in which the value of the size N may be modified according to the implementation.

Furthermore, although described as using FFT and IFFT, this is only illustrative and should not be interpreted as limiting the scope of the disclosure. Other types of transforms can be used, such as discrete Fourier transform (DFT) and inverse discrete Fourier transform (IDFT) functions. It should be understood that for DFT and IDFT functions, the value of variable N may be any integer (such as 1, 2, 3, 4, etc.), while for FFT and IFFT functions, the value of variable N may be any integer which is a power of 2 (such as 1, 2, 4, 8, 16, etc.).

Although FIGS. 2A and 2B illustrate examples of wireless transmission and reception paths, various changes may be made to FIGS. 2A and 2B. For example, various components in FIGS. 2A and 2B can be combined, further subdivided or omitted, and additional components can be added according to specific requirements. Furthermore, FIGS. 2A and 2B are intended to illustrate examples of types of transmission and reception paths that can be used in a wireless network. Any other suitable architecture can be used to support wireless communication in a wireless network.

Figure 3A:
FIG. 3A illustrates an example a user equipment (UE) according to various embodiments of the present disclosure.

FIG. 3A illustrates an example UE 116 according to the present disclosure. The embodiment of the UE 116 shown in FIG. 3A is for illustration only, and the UEs 111-115 of FIG. 1 can have the same or similar configuration. However, a UE has various configurations, and FIG. 3a does not limit the scope of the disclosure to any specific implementation of the UE.

The UE 116 includes an antenna 305, a radio frequency (RF) transceiver 310, a transmission (TX) processing circuit 315, a microphone 320, and a reception (RX) processing circuit 325. UE 116 also includes a speaker 330, a processor/controller 340, an input/output (110) interface 345, an input device(s) 350, a display 355, and a memory 360. The memory 360 includes an operating system (OS) 361 and one or more applications 362.

The RF transceiver 310 receives an incoming RF signal transmitted by a gNB of the wireless network 100 from the antenna 305. The RF transceiver 310 down-converts the incoming RF signal to generate an intermediate frequency (IF) or baseband signal. The IF or baseband signal is transmitted to the RX processing circuit 325, where the RX processing circuit 325 generates a processed baseband signal by filtering, decoding and/or digitizing the baseband or IF signal. The RX processing circuit 325 transmits the processed baseband signal to speaker 330 (such as for voice data) or to processor/controller 340 for further processing (such as for web browsing data).

The TX processing circuit 315 receives analog or digital voice data from microphone 320 or other outgoing baseband data (such as network data, email or interactive video game data) from processor/controller 340. The TX processing circuit 315 encodes, multiplexes, and/or digitizes the outgoing baseband data to generate a processed baseband or IF signal. The RF transceiver 310 receives the outgoing processed baseband or IF signal from the TX processing circuit 315 and up-converts the baseband or IF signal into an RF signal transmitted via the antenna 305.

The processor/controller 340 can include one or more processors or other processing devices and execute an OS 361 stored in the memory 360 in order to control the overall operation of UE 116. For example, the processor/controller 340 can control the reception of forward channel signals and the transmission of backward channel signals through the RF transceiver 310, the RX processing circuit 325 and the TX processing circuit 315 according to well-known principles. In some embodiments, the processor/controller 340 includes at least one microprocessor or microcontroller.

The processor/controller 340 is also capable of executing other processes and programs residing in the memory 360, such as operations for channel quality measurement and reporting for systems with 2D antenna arrays as described in embodiments of the disclosure. The processor/controller 340 can move data into or out of the memory 360 as required by an execution process. In some embodiments, the processor/controller 340 is configured to execute the application 362 based on the OS 361 or in response to signals received from the gNB or the operator. The processor/controller 340 is also coupled to an I/O interface 345, where the I/O interface 345 provides UE 116 with the ability to connect to other devices such as laptop computers and handheld computers. I/O interface 345 is a communication path between these accessories and the processor/controller 340.

The processor/controller 340 is also coupled to the input device(s) 350 and the display 355. An operator of the UE 116 can input data into the UE 116 using the input device(s) 350. The display 355 may be a liquid crystal display or other display capable of presenting text and/or at least limited graphics (such as from a website). The memory 360 is coupled to the processor/controller 340. A part of the memory 360 can include a random access memory (RAM), while another part of the memory 360 can include a flash memory or other read-only memory (ROM).

Although FIG. 3A illustrates an example of UE 116, various changes can be made to FIG. 3A. For example, various components in FIG. 3A can be combined, further subdivided or omitted, and additional components can be added according to specific requirements. As a specific example, the processor/controller 340 can be divided into a plurality of processors, such as one or more central processing units (CPUs) and one or more graphics processing units (GPUs). Furthermore, although FIG. 3A illustrates that the UE 116 is configured as a mobile phone or a smart phone, UEs can be configured to operate as other types of mobile or fixed devices.

Figure 3B:
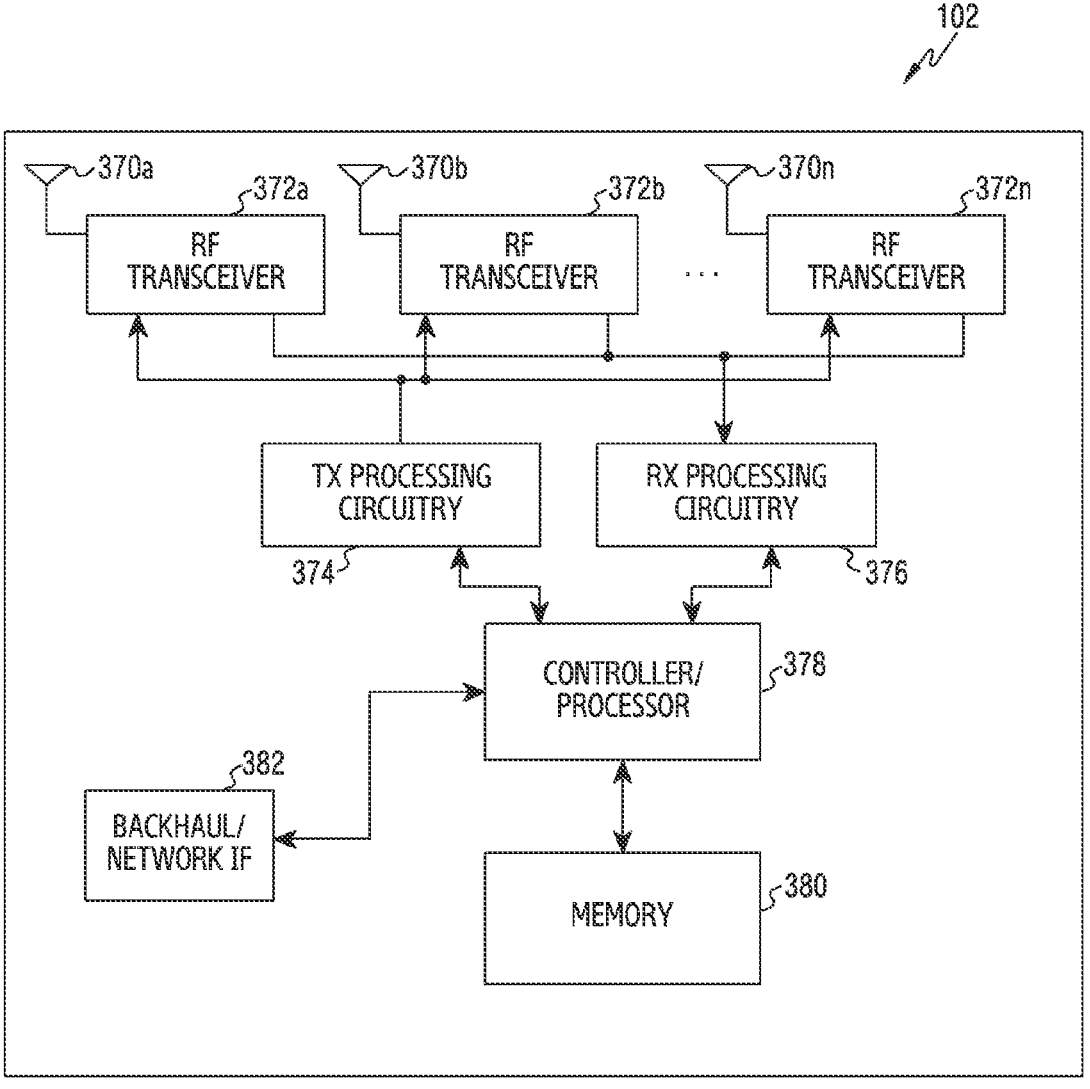
FIG. 3B illustrates an example gNB according to various embodiments of the present disclosure.

FIG. 3B illustrates an example gNB 102 according to the disclosure. The embodiment of the gNB 102 shown in FIG. 3B is for illustration only, and other gNBs of FIG. 1 can have the same or similar configuration. However, a gNB has various configurations, and FIG. 3B does not limit the scope of the disclosure to any specific implementation of a gNB. It should be noted that the gNB 101 and the gNB 103 can include the same or similar structures as the gNB 102.

As shown in FIG. 3B, the gNB 102 includes a plurality of antennas 370a-370n, a plurality of RF transceivers 372a-372n, a transmission (TX) processing circuit 374, and a reception (RX) processing circuit 376. In certain embodiments, one or more of the plurality of antennas 370a-370n include a 2D antenna array. The gNB 102 also includes a controller/processor 378, a memory 380, and a backhaul or network interface 382.

RF transceivers 372a-372n receive an incoming RF signal from antennas 370a-370n, such as a signal transmitted by UEs or other gNBs. RF transceivers 372a-372n down-convert the incoming RF signal to generate an IF or baseband signal. The IF or baseband signal is transmitted to the RX processing circuit 376, where the RX processing circuit 376 generates a processed baseband signal by filtering, decoding and/or digitizing the baseband or IF signal. RX processing circuit 376 transmits the processed baseband signal to controller/processor 378 for further processing.

The TX processing circuit 374 receives analog or digital data (such as voice data, network data, email or interactive video game data) from the controller/processor 378. TX processing circuit 374 encodes, multiplexes and/or digitizes outgoing baseband data to generate a processed baseband or IF signal. RF transceivers 372a-372n receive the outgoing processed baseband or IF signal from TX processing circuit 374 and up-convert the baseband or IF signal into an RF signal transmitted via antennas 370a-370n.

The controller/processor 378 can include one or more processors or other processing devices that control the overall operation of the gNB 102. For example, the controller/processor 378 can control the reception of forward channel signals and the transmission of backward channel signals through the RF transceivers 372a-372n, the RX processing circuit 376 and the TX processing circuit 374 according to well-known principles. The controller/processor 378 can also support additional functions, such as higher layer wireless communication functions. For example, the controller/processor 378 can perform a blind interference sensing (BIS) process such as that performed through a BIS algorithm, and decode a received signal from which an interference signal is subtracted. A controller/processor 378 may support any of a variety of other functions in the gNB 102. In some embodiments, the controller/processor 378 includes at least one microprocessor or microcontroller.

The controller/processor 378 is also capable of executing programs and other processes residing in the memory 380, such as a basic OS. The controller/processor 378 can also support channel quality measurement and reporting for systems with 2D antenna arrays as described in embodiments of the disclosure. In some embodiments, the controller/processor 378 supports communication between entities such as web RTCs. The controller/processor 378 can move data into or out of the memory 380 as required by an execution process.

The controller/processor 378 is also coupled to the backhaul or network interface 382. The backhaul or network interface 382 allows the gNB 102 to communicate with other devices or systems through a backhaul connection or through a network. The backhaul or network interface 382 can support communication over any suitable wired or wireless connection(s). For example, when the gNB 102 is implemented as a part of a cellular communication system, such as a cellular communication system supporting 5G or new radio access technology or NR, LTE or LTE-A, the backhaul or network interface 382 can allow the gNB 102 to communicate with other gNBs through wired or wireless backhaul connections. When the gNB 102 is implemented as an access point, the backhaul or network interface 382 can allow the gNB 102 to communicate with a larger network, such as the Internet, through a wired or wireless local area network or through a wired or wireless connection. The backhaul or network interface 382 includes any suitable structure that supports communication through a wired or wireless connection, such as an Ethernet or an RF transceiver.

The memory 380 is coupled to the controller/processor 378. A part of the memory 380 can include an RAM, while another part of the memory 380 can include a flash memory or other ROMs. In certain embodiments, a plurality of instructions, such as the BIS algorithm, are stored in the memory. The plurality of instructions are configured to cause the controller/processor 378 to execute the BIS process and decode the received signal after subtracting at least one interference signal determined by the BIS algorithm.

As will be described in more detail below, the transmission and reception paths of gNB 102 (implemented using RF transceivers 372a-372n, TX processing circuit 374 and/or RX processing circuit 376) support aggregated communication with FDD cells and TDD cells.

Although FIG. 3B illustrates an example of the gNB 102, various changes may be made to FIG. 3B. For example, the gNB 102 can include any number of each component shown in FIG. 3A. As a specific example, the access point can include many backhaul or network interfaces 382, and the controller/processor 378 can support routing functions to route data between different network addresses. As another specific example, although shown as including a single instance of the TX processing circuit 374 and a single instance of the RX processing circuit 376, gNB 102 can include multiple instances of each (such as one for each RF transceiver).

Those skilled in the art will understand that "terminal" and "terminal device" as used herein include not only devices with wireless signal receiver which have no transmitting capability, but also devices with receiving and transmitting hardware which can carry out bidirectional communication on a bidirectional communication link. Such devices may include cellular or other communication devices with single-line displays or multi-line displays or cellular or other communication devices without multi-line displays; a personal communications service (PCS), which may combine voice, data processing, fax and/or data communication capabilities; a personal digital assistant (PDA), which may include a radio frequency receiver, a pager, an internet/intranet access, a web browser, a notepad, a calendar and/or a global positioning system (GPS) receiver; a conventional laptop and/or palmtop computer or other devices having and/or including a radio frequency receiver. "terminal" and "terminal device" as used herein may be portable, transportable, installed in vehicles (aviation, sea transportation and/or land), or suitable and/or configured to operate locally, and/or in distributed form, operate on the earth and/or any other position in space. "Terminal" and "terminal device" as used herein may also be a communication terminal, an internet terminal, a music/video playing terminal, such as a PDA, a mobile internet device (MID) and/or a mobile phone with music/video playing functions, a smart TV, a set-top box and other devices.

Exemplary embodiments of the disclosure are further described below with reference to the drawings.

With the rapid development of information industry, especially the increasing demand from mobile Internet and internet of things (IoT), it brings unprecedented challenges to the future mobile communication technology. According to the report of International Telecommunication Union (ITU) ITU-R M.[IMT.BEYOND 2020.TRAFFIC], it can be predicted that by 2020, compared with 2010 (4G era), the growth of mobile traffic will be nearly 1000 times, and the number of UE connections will also exceed 17 billion, and the number of connected devices will be even more alarming, with the massive IoT devices gradually infiltrating into the mobile communication network. In order to meet the unprecedented challenges, the communication industry and academia have carried out extensive research on the fifth generation (5G) mobile communication technology to face the 2020s. At present in ITU report ITU-R M.[IMT.VISION], the framework and overall goals of the future 5G has been discussed, in which the demand outlook, application scenarios and important performance indicators of 5G are described in detail. With respect to new requirements in 5G, ITU report ITU-R M.[IMT.FUTURE TECHNOLOGY TRENDS] provides information related to the technology trends of 5G, aiming at solving significant problems such as significantly improved system throughput, consistent user experience, scalability to support IoT, delay, energy efficiency, cost, network flexibility, support of emerging services and flexible spectrum utilization.

In 3rd generation partnership project (3GPP), the first stage of 5G is already in progress. To support more flexible scheduling, the 3GPP decides to support variable hybrid automatic repeat request-acknowledgement (HARQ-ACK) feedback delay in 5G. In existing long term evolution (LTE) systems, a time from downlink data reception to uplink transmission of HARQ-ACK is fixed. For example, in frequency division duplex (FDD) systems, the delay is 4 subframes. In time division duplex (TDD) systems, a HARQ-ACK feedback delay is determined for a corresponding downlink subframe based on an uplink and downlink configuration. In 5G systems, whether FDD or TDD systems, for a determined downlink time unit (for example, a downlink slot or a downlink mini slot), the uplink time unit that can feedback HARQ-ACK is variable. For example, the delay of HARQ-ACK feedback can be dynamically indicated by physical layer signaling, or different HARQ-ACK delays can be determined based on factors such as different services or user capabilities.

The 3GPP has defined three directions of 5G application scenarios-enhanced mobile broadband (e-MBB), massive machine-type communication (mMTC) and ultra-reliable and low-latency communication (URLLC). The eMBB scenario aims to further improve data transmission rate on the basis of the existing mobile broadband service scenario, so as to enhance user experience and pursue ultimate communication experience between people. mMTC and URLLC are, for example, the application scenarios of the Internet of Things, but their respective emphases are different: mMTC being mainly information interaction between people and things, while URLLC mainly reflecting communication requirements between things.

In 5G, a UE can support flexible numerologies, larger bandwidth and more flexible scheduling. When SCS is large, the absolute time of a slot may be small. The scheduling on the basis of a slot may cause large DCI overhead. In order to reduce the DCI overhead, each DCI can be used to schedule multiple PDSCHs and/or PUSCHs. How to design the scheduling of multiple PDSCHs and/or PUSCHs and the methods of HARQ-ACK feedback are urgent problems to be solved.

In order to solve at least the above technical problems, embodiments of the disclosure provide a method performed by a terminal, the terminal, a method performed by a base station and the base station in a wireless communication system, and a non-transitory computer-readable storage medium. Hereinafter, various embodiments of the disclosure will be described in detail with reference to the accompanying drawings.

In embodiments of the disclosure, for the convenience of description, a first node and a second node are defined. For example, the first node may be a base station, and the second node may be a UE. In the following examples, the base station is taken as an example (but not limited thereto) to illustrate the first node, and the UE is taken as an example (but not limited thereto) to illustrate the second node.

Exemplary embodiments of the disclosure are further described below with reference to the drawings.

The text and drawings are provided as examples only to help readers understand the disclosure. They are not intended and should not be interpreted as limiting the scope of the disclosure in any way. Although certain embodiments and examples have been provided, based on the content disclosed herein, it will be apparent to those skilled in the art that changes may be made to the illustrated embodiments and examples without departing from the scope of the disclosure.

Figure 4:
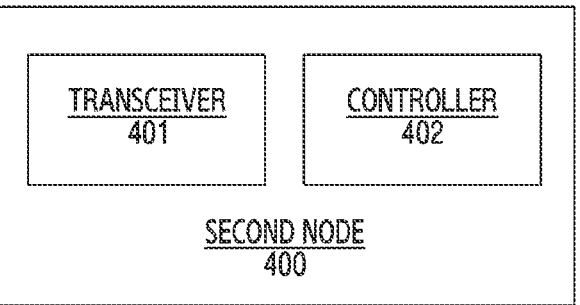
FIG. 4 illustrates a block diagram of a second node 400 according to various embodiments of the present disclosure.

FIG. 4 illustrates a block diagram of the second node according to various embodiments of the present disclosure.

Referring to FIG. 4, the second node 400 may include a transceiver 401 and a controller 402.

The transceiver 401 may be configured to receive first data and/or first control signaling from the first node, and transmit second data and/or second control signaling to the first node in a determined time unit.

The controller 402 may be an application specific integrated circuit or at least one processor. The controller 402 may be configured to control the overall operation of the second node and control the second node to implement the methods proposed in embodiments of the disclosure. For example, the controller 402 may be configured to determine the second data and/or the second control signaling and a time unit for transmitting the second data and/or the second control signaling based on the first data and/or the first control signaling, and control the transceiver 401 to transmit the second data and/or the second control signaling to the first node in the determined time unit.

In some implementations, the controller 402 may be configured to perform one or more methods of various embodiments described below. For example, the controller 402 may be configured to perform one or more of operations in a method 500 to be described later in connection with FIG. 5 and/or a method 1100 described in connection with FIG. 11.

In some implementations, the first data may be data transmitted by the first node to the second node. In the following examples, downlink data carried by a physical downlink shared channel (PDSCH) is taken as an example (but not limited thereto) to illustrate the first data.

In some implementations, the second data may be data transmitted by the second node to the first node. In the following examples, uplink data carried by a physical uplink shared channel (PUSCH) is taken as an example to illustrate the second data, but not limited thereto.

In some implementations, the first control signaling may be control signaling transmitted by the first node to the second node. In the following examples, downlink control signaling is taken as an example (but not limited thereto) to illustrate the first control signaling. The downlink control signaling may be downlink control information (DCI) carried by a physical downlink control channel (PDCCH) and/or control signaling carried by a physical downlink shared channel (PDSCH). For example, the DCI may be UE specific DCI, and the DCI may also be common DCI. The common DCI may be DCI common to a part of UEs, such as group common DCI, and the common DCI may also be DCI common to all of the UEs. The DCI may be uplink DCI (e.g., DCI for scheduling a PUSCH) and/or downlink DCI (e.g., DCI for scheduling a PDSCH).

In some implementations, the second control signaling may be control signaling transmitted by the second node to the first node. In the following examples, uplink control signaling is taken as an example (but is not limited thereto) to illustrate the second control signaling. The uplink control signaling may be uplink control information (UCI) carried by a physical uplink control channel (PUCCH) and/or control signaling carried by a physical uplink shared channel (PUSCH). A type of UCI may include one or more of: HARQ-ACK information, scheduling request (SR), link recovery request (LRR), channel state information (CSI) or configured grant (CG) UCI.

In some implementations, a PUCCH carrying SR may be a PUCCH carrying positive SR and/or negative SR.

In some implementations, CSI can also be Part 1 CSI (first part CSI) and/or Part 2 CSI (second part CSI).

In some implementations, a first time unit is a time unit in which the first node transmits the first data and/or the first control signaling. In the following examples, a downlink time unit is taken as an example (but not limited thereto) to illustrate the first time unit.

In some implementations, a second time unit is a time unit in which the second node transmits the second data and/or the second control signaling. In the following examples, an uplink time unit is taken as an example (but not limited thereto) to illustrate the second time unit.

In some implementations, the first time unit and the second time unit may be one or more slots, one or more subslots, one or more OFDM symbols, or one or more subframes.

Herein, depending on the network type, the term "base station" or "BS" can refer to any component (or a set of components) configured to provide wireless access to a network, such as a transmission point (TP), a transmission and reception point (TRP), an evolved base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio (NR) interface/access, LTE, LTE advanced (LTE-A), high speed packet access (HSPA), Wi-Fi 802.11a/b/g/n/ac, etc.

In describing a wireless communication system and in the disclosure described below, higher layer signaling or higher layer signals may be signal transferring methods for transferring information from a base station to a terminal over a downlink data channel of a physical layer or from a terminal to a base station over an uplink data channel of a physical layer, and examples of the signal transferring methods may include signal transferring methods for transferring information via radio resource control (RRC) signaling, packet data convergence protocol (PDCP) signaling, or a medium access control (MAC) control element (MAC CE).

Figure 5:
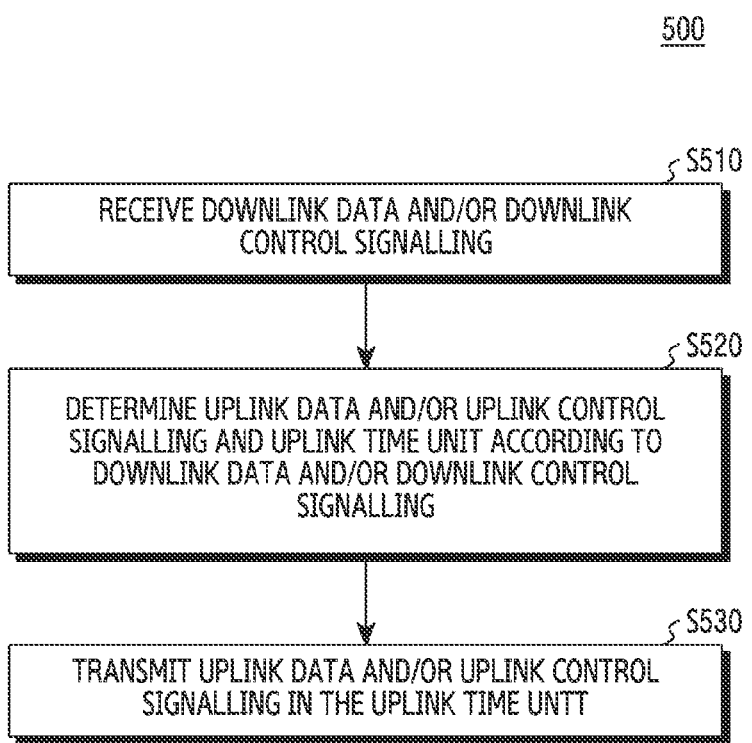
FIG. 5 illustrates a flowchart of a method 500 performed by a UE according to various embodiments of the present disclosure.

FIG. 5 illustrates a flowchart of a method 500 performed by a UE (or, a terminal) according to various embodiments of the present disclosure.

Referring to FIG. 5, in step S510, the UE may receive downlink data (e.g., downlink data carried by a PDSCH) and/or downlink control signaling from a base station. For example, the UE may receive the downlink data and/or the downlink control signaling from the base station based on predefined rules and/or received configuration parameters.

In step S520, the UE determines uplink data and/or uplink control signaling and an uplink time unit based on the downlink data and/or downlink control signaling.

In step S530, the UE transmits the uplink data and/or the uplink control signaling to the base station in an uplink time unit.

In some implementations, acknowledgement/negative acknowledgement (ACK/NACK) for downlink transmissions may be performed through HARQ-ACK.

In some implementations, the downlink control signaling may include DCI carried by a PDCCH and/or control signaling carried by a PDSCH. For example, the DCI may be used to schedule transmission of a PUSCH or a PDSCH reception. Some examples of uplink transmission timing will be described below with reference to FIGS. 6A-6C.

Figure 6A:
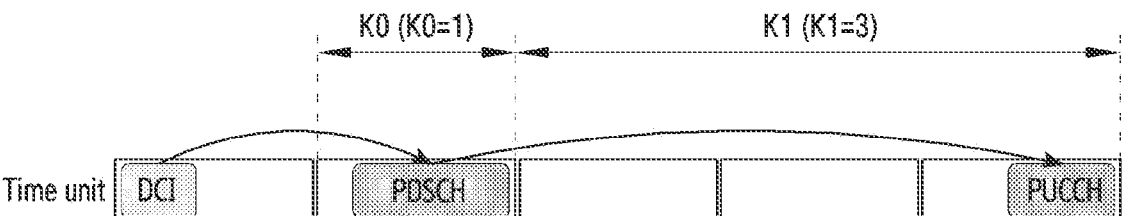
FIG. 6A illustrates some examples of uplink transmission timing according to various embodiments of the present disclosure.

In an example, the UE receives the DCI and receives the PDSCH based on time domain resources indicated by the DCI. For example, a parameter K0 may be used to represent a time interval between the PDSCH scheduled by the DCI and the PDCCH carrying the DCI, and K0 may be in units of slots. For example, FIG. 6A gives an example in which K0=1. In the example illustrated in FIG. 6A, the time interval from the PDSCH scheduled by the DCI to the PDCCH carrying the DCI is one slot.

Figure 6B:
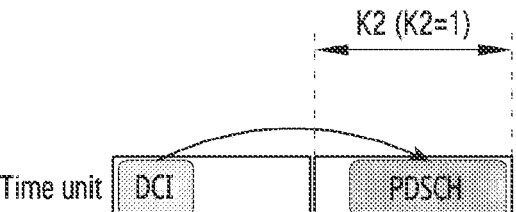
FIG. 6B illustrates some examples of uplink transmission timing according to various embodiments of the present disclosure.

In another example, the UE receives the DCI and transmits the PUSCH based on time domain resources indicated by the DCI. For example, a parameter K2 may be used to represent a time interval between the PUSCH scheduled by the DCI and the PDCCH carrying the DCI, and K2 may be in units of slots. For example, FIG. 6B gives an example in which K2=1. In the example illustrated in FIG. 6B, the time interval between the PUSCH scheduled by the DCI and the PDCCH carrying the DCI is one slot.

In yet another example, the UE receives the PDSCH, and may transmit HARQ-ACK information for the PDSCH in a PUCCH in the uplink time unit. For example, a parameter K1 (e.g., the parameter dl-DataToUL-ACK in 3GPP) may be used to represent a time interval between the PUCCH for transmitting the HARQ-ACK information for the PDSCH and the PDSCH, and K1 may be in units of uplink time units, such as slots or subslots. In a case where K1 is in units of slots, the time interval is a value of a slot offset between the PUCCH for feeding back the HARQ-ACK information for the PDSCH and the PDSCH. For example, FIG. 6A gives an example in which K1=3. In the example illustrated in FIG. 6A, the time interval between the PUCCH for transmitting the HARQ-ACK information for the PDSCH and the PDSCH is 3 slots.

The PDSCH may be a PDSCH scheduled by the DCI and/or an SPS PDSCH. The UE may periodically receive the SPS PDSCH after the SPS PDSCH is activated by the DCI. In examples of the disclosure, the SPS PDSCH may be equivalent to a PDSCH not scheduled by the DCI/PDCCH. After the SPS PDSCH is released (deactivated), the UE may no longer receive the SPS PDSCH.

Figure 6C:
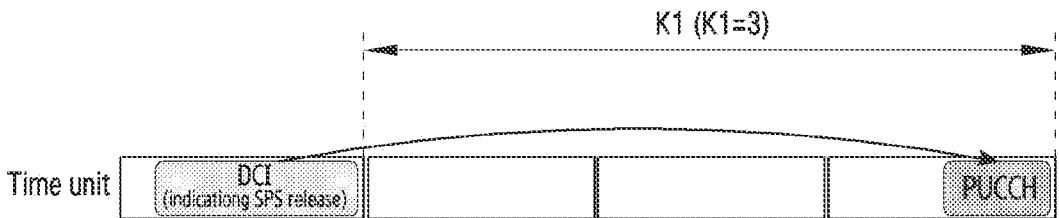
FIG. 6C illustrates some examples of uplink transmission timing according to various embodiments of the present disclosure.

In yet another example, the UE receives the DCI (e.g., DCI indicating SPS (Semi-Persistent Scheduling) PDSCH release (deactivation)), and may transmit HARQ-ACK information for the DCI in the PUCCH in the uplink time unit. For example, the parameter K1 may be used to represent a time interval between the PUCCH for transmitting the HARQ-ACK information for the DCI and the DCI, and K1 may be in units of uplink time units, such as slots or subslots. For example, FIG. 6C gives an example in which K1=3. In the example of FIG. 6C, the time interval between the PUCCH for transmitting the HARQ-ACK information for the DCI and the DCI is 3 slots. For example, the parameter K1 may be used to represent a time interval between an SPS PDSCH reception and the PUCCH feeding back HARQ-ACK for the SPS PDSCH reception, where K1 is indicated in DCI activating the SPS PDSCH. In some implementations, in step S520, the UE may report (signal/transmit) a UE capability to the base station or indicate the UE capability. For example, the UE reports (signals/transmits) the UE capability to the base station by transmitting the PUSCH. In this case, the UE capability information is included in the PUSCH transmitted by the UE.

In some implementations, the base station may configure higher layer signaling for the UE based on a UE capability previously received from the UE (for example, in step S510 in the previous downlink-uplink transmission processes). For example, the base station configures the higher layer signaling for the UE by transmitting the PDSCH. In this case, the higher layer signaling configured for the UE is included in the PDSCH transmitted by the base station. It should be noted that the higher layer signaling is higher layer signaling compared with physical layer signaling, and the higher layer signaling may include RRC signaling and/or a MAC CE.

In some implementations, the UE may be configured with two levels of priorities for uplink transmission. For example, the two levels of priorities may include a first priority and a second priority which are different from each other. In an example, the first priority may be higher than the second priority. In another example, the first priority may be lower than the second priority. However, embodiments of the disclosure are not limited to this, and for example, the UE may be configured with more than two levels of priorities. For the sake of convenience, in embodiments of the disclosure, description will be made considering that the first priority is higher than the second priority. It should be noted that all embodiments of the disclosure are applicable to situations where the first priority may be higher than the second priority; all embodiments of the disclosure are applicable to situations where the first priority may be lower than the second priority; and all embodiments of the disclosure are applicable to situations where the first priority may be equal to the second priority.

In various embodiments of the present disclosure, a unicast may refer to a manner in which a network communicates with a UE, and multicast/broadcast may refer to a manner in which a network communicates with multiple UEs. For example, a unicast PDSCH may be a PDSCH received by a UE, and the scrambling of the PDSCH may be based on a radio network temporary identifier (RNTI) specific to the UE, e.g., cell-RNTI (C-RNTI). The unicast PDSCH may also be a unicast SPS PDSCH. A multicast/broadcast PDSCH may be a PDSCH received by more than one UE simultaneously, and the scrambling of the multicast/broadcast PDSCH may be based on a UE-group common RNTI. For example, the UE-group common RNTI for scrambling the multicast/broadcast PDSCH may include an RNTI (referred to as G-RNTI in embodiments of the disclosure) for scrambling of a dynamically scheduled multicast/broadcast transmission (e.g., PDSCH) or an RNTI (referred to as G-CS-RNTI in embodiments of the disclosure) for scrambling of a multicast/broadcast SPS transmission (e.g., SPS PDSCH). The G-CS-RNTI and the G-RNTI may be different RNTIs or same RNTI. UCI(s) of the unicast PDSCH may include HARQ-ACK information, SR, or CSI of the unicast PDSCH. UCI(s) of the multicast (groupcast)/broadcast PDSCH may include HARQ-ACK information for the multicast/broadcast PDSCH. In various embodiments of the present disclosure, "multicast/broadcast" may refer to at least one of multicast or broadcast.

In some implementations, a HARQ-ACK codebook may include HARQ-ACK information for one or more PDSCHs and/or DCI. If the HARQ-ACK information for the one or more PDSCHs and/or DCI is transmitted in a same uplink time unit, the UE may generate the HARQ-ACK codebook based on a predefined rule. For example, if a PDSCH is successfully decoded, the HARQ-ACK information for this PDSCH is positive ACK. The positive ACK may be represented by 1 in the HARQ-ACK codebook, for example. If a PDSCH is not successfully decoded, the HARQ-ACK information for this PDSCH is Negative ACK (NACK). NACK may be represented by 0 in the HARQ-ACK codebook, for example. For example, the UE may generate the HARQ-ACK codebook based on the pseudo code specified by protocols. In an example, if the UE receives a DCI format that indicates SPS PDSCH release (deactivation), the UE transmits the corresponding HARQ-ACK information (ACK) for the DCI format. In another example, if the UE receives a DCI format that indicates secondary cell dormancy, the UE transmits the HARQ-ACK information (ACK) for the DCI format.

In yet another example, if the UE receives a DCI format that indicates to transmit HARQ-ACK information (e.g., a Type-3 HARQ-ACK codebook in 3GPP) of all HARQ-ACK processes of all configured serving cells, the UE transmits the HARQ-ACK information of all HARQ-ACK processes of all configured serving cells. In order to reduce a size of the Type-3 HARQ-ACK codebook, in an enhanced Type-3 HARQ-ACK codebook, the UE may transmit HARQ-ACK information of a specific HARQ-ACK process of a specific serving cell based on an indication of the DCI. In yet another example, if the UE receives a DCI format that schedules a PDSCH, the UE transmits the corresponding HARQ-ACK information for the PDSCH. In yet another example, the UE receives a SPS PDSCH, and the UE transmits the corresponding HARQ-ACK information for the SPS PDSCH. In yet another example, if the UE is configured by higher layer signaling to receive a SPS PDSCH, the UE transmits the corresponding HARQ-ACK information for the SPS PDSCH. The SPS PDSCH reception configured by higher layer signaling may be cancelled by other signaling. In yet another example, if at least one uplink symbol (e.g., OFDM symbol) of the UE in a semi-static frame structure configured by higher layer signaling overlaps with a symbol of a SPS PDSCH, the UE does not receive the SPS PDSCH. In yet another example, if the UE is configured by higher layer signaling to receive a SPS PDSCH according to a predefined rule, the UE transmits the corresponding HARQ-ACK information for the SPS PDSCH reception.

In some implementations, if HARQ-ACK information transmitted in a same uplink time unit does not include HARQ-ACK information for any DCI format, nor does it include HARQ-ACK information for a dynamically scheduled PDSCH (e.g., a PDSCH scheduled by a DCI format) and/or DCI, or the HARQ-ACK information transmitted in the same uplink time unit only includes HARQ-ACK information for one or more SPS PDSCH, the UE may generate HARQ-ACK information according to a rule for generating a SPS PDSCH HARQ-ACK codebook.

In some implementations, if HARQ-ACK information transmitted in a same uplink time unit includes HARQ-ACK information for a DCI format, and/or a dynamically scheduled PDSCH (e.g., a PDSCH scheduled by a DCI format), the UE may generate HARQ-ACK information according to a rule for generating a HARQ-ACK codebook for a dynamically scheduled PDSCH and/or a DCI format. For example, the UE may determine to generate a semi-static HARQ-ACK codebook (e.g., Type-1 HARQ-ACK codebook in 3GPP) or a dynamic HARQ-ACK codebook (e.g., Type-2 HARQ-ACK codebook in 3GPP) according to a PDSCH HARQ-ACK codebook configuration parameter (e.g., the parameter pdsch-HARQ-ACK-Codebook in 3GPP). The dynamic HARQ-ACK codebook may also be an enhanced dynamic HARQ-ACK codebook (e.g., Type-2 HARQ-ACK codebook based on grouping and HARQ-ACK retransmission in 3GPP).

In some implementations, if HARQ-ACK information transmitted in a same uplink time unit includes only HARQ-ACK information for a SPS PDSCH (e.g., a PDSCH not scheduled by a DCI format), the UE may generate the HARQ-ACK codebook according to a rule for generating a HARQ-ACK codebook for a SPS PDSCH (e.g., the pseudo code for generating a HARQ-ACK codebook for a SPS PDSCH defined in 3GPP).

In some implementations, the dynamic HARQ-ACK codebook and/or the enhanced dynamic HARQ-ACK codebook may determine a size and an order of the HARQ-ACK codebook according to an assignment indicator. For example, the assignment indicator may be a DAI (Downlink Assignment Indicator). In the following embodiments, the assignment indicator as the DAI is taken as an example for illustration. However, the embodiments of the disclosure are not limited thereto, and any other suitable assignment indicator may be adopted.

In some implementations, a DAI field includes at least one of a first DAI and a second DAI.

In some examples, the first DAI may be a C-DAI (Counter-DAI). The first DAI may indicate an accumulative number of at least one of DCI scheduling PDSCH(s), DCI indicating SPS PDSCH release (deactivation), or DCI indicating secondary cell dormancy. For example, the accumulative number may be an accumulative number up to the current serving cell and/or the current time unit. For example, C-DAI may refer to: an accumulative number of {serving cell, time unit} pair(s) scheduled by PDCCH(s) up to the current time unit within a time window (which may also include a number of PDCCHs (e.g., PDCCHs indicating SPS release and/or PDCCHs indicating secondary cell dormancy)); or an accumulative number of PDCCH(s) up to the current time unit; or an accumulative number of PDSCH transmission(s) up to the current time unit; or an accumulative number of {serving cell, time unit} pair(s) in which PDSCH transmission(s) related to PDCCH(s) (e.g., scheduled by the PDCCH(s)) and/or PDCCH(s) (e.g., PDCCH indicating SPS release and/or PDCCH indicating secondary cell dormancy) is present, up to the current serving cell and/or the current time unit; or an accumulative number of PDSCH(s) with corresponding PDCCH(s) and/or PDCCHs (e.g., PDCCHs indicating SPS release and/or PDCCHs indicating secondary cell dormancy) already scheduled by a base station up to the current serving cell and/or the current time unit; or an accumulative number of PDSCHs (the PDSCHs are PDSCHs with corresponding PDCCHs) already scheduled by the base station up to the current serving cell and/or the current time unit; or an accumulative number of time units with PDSCH transmissions (the PDSCHs are PDSCHs with corresponding PDCCHs) already scheduled by the base station up to the current serving cell and/or the current time unit. The order of each bit in the HARQ-ACK codebook corresponding to at least one of PDSCH reception(s), DCI(s) indicating SPS PDSCH release (deactivation), or DCI(s) indicating secondary cell dormancy may be determined by the time when the first DAI is received and the information of the first DAI. The first DAI may be included in a downlink DCI format.

In some examples, the second DAI may be a T-DAI (Total-DAI). The second DAI may indicate a total count of at least one of all PDSCH receptions, DCI indicating SPS PDSCH release (deactivation), or DCI indicating secondary cell dormancy. For example, the total number may be a total number of all serving cells up to the current time unit. For example, T-DAI may refer to: a total number of {serving cell, time unit} pairs scheduled by PDCCH(s) up to the current time unit within a time window (which may also include a number of PDCCHs for indicating SPS release); or a total number of PDSCH transmissions up to the current time unit; or a total number of {serving cell, time unit} pairs in which PDSCH transmission(s) related to PDCCH(s) (e.g., scheduled by the PDCCH) and/or PDCCH(s) (e.g., a PDCCH indicating SPS release and/or a PDCCH indicating secondary cell dormancy) is present, up to the current serving cell and/or the current time unit, or a total number of PDSCHs with corresponding PDCCHs and/or PDCCHs (e.g., PDCCHs indicating SPS release and/or PDCCHs indicating secondary cell dormancy) already scheduled by a base station up to the current serving cell and/or the current time unit; or a total number of PDSCHs (the PDSCHs are PDSCHs with corresponding PDCCHs) already scheduled by the base station up to the current serving cell and/or the current time unit, or a total number of time units with PDSCH transmissions (for example, the PDSCHs are PDSCHs with corresponding PDCCHs) already scheduled by the base station up to the current serving cell and/or the current time unit. The second DAI may be included in the downlink DCI format and/or an uplink DCI format. The second DAI included in the uplink DCI format is also referred to as UL DAI.

In the following examples, the first DAI as the C-DAI and the second DAI as the T-DAI are taken as an example for illustration, but the examples are not limited thereto.

Tables 1 and 2 show a correspondence between the DAI field and $V_{T\text{-}DAI,m}$ or $V_{C\text{-}DAI,c,m}$. Numbers of bits of the C-DAI and T-DAI are limited.

For example, in a case where the C-DAI or T-DAI is represented with 2 bits, the value of the C-DAI or T-DAI in the DCI may be determined by equations in Table 1. $V_{T\text{-}DAI,m}$ is the value of the T-DAI in DCI received in a PDCCH monitoring occasion (MO)m, and $V_{C\text{-}DAI,c,m}$ is the value of the C-DAI in DCI for a serving cell c received in the PDCCH monitoring occasion m. Both $V_{T\text{-}DAI,m}$ and $V_{C\text{-}DAI,c,m}$ are related to the number of bits of the DAI field in the DCI. MSB is the Most Significant Bit and LSB is the Least Significant Bit.

TABLE 1

| MSB, LSB of DAI Field | $V_{T\text{-}DAI,\,m}$ or $V_{C\text{-}DAI,\,c,\,m}$ | Y |
|---|---|---|
| 0, 0 | 1 | (Y − 1) mod 4 + 1 = 1 |
| 0, 1 | 2 | (Y − 1) mod 4 + 1 = 2 |
| 1, 0 | 3 | (Y − 1) mod 4 + 1 = 3 |
| 1, 1 | 4 | (Y − 1) mod 4 + 1 = 4 |

For example, when the C-DAI or T-DAI is 1, 5, or 9, as shown in Table 1, all of the DAI field are indicated with "00", and the value of $V_{T\text{-}DAI,m}$ or $V_{C\text{-}DAI,c,m}$ is represented as "1" by the equation in Table 1. Y may represent the value of the DAI corresponding to the number of DCIs actually transmitted by the base station (the value of the DAI before conversion by the equation in the table).

For example, in a case where the C-DAI or T-DAI in the DCI is 1 bit, values greater than 2 may be represented by equations in Table 2.

TABLE 2

| DAI field | $V_{T\text{-}DAI,\,m}$ or $V_{C\text{-}DAI,\,c,\,m}$ | Y |
|---|---|---|
| 0 | 1 | (Y − 1) mod 2 + 1 = 1 |
| 1 | 2 | (Y − 1) mod 2 + 1 = 2 |

In some implementations, one downlink DCI format can schedule 1 or Np PDSCHs. Where Np is an integer greater than 1. The base station can configure a PDSCH time domain resource allocation (TDRA) table T for the UE to determine the possible time resources of the PDSCHs. A row in the table T may indicate the time resource information of one or more PDSCHs. The time resource information of each PDSCH includes a start and length indicator value (SLIV), K0 and a PDSCH mapping type. For example, the base station configures the time domain resource allocation list (corresponding to the PDSCH TDRA table T) of PDSCHs, for example, through PDSCH-TimeDomainResourceAllocationList. The PDSCH-TimeDomainResourceAllocationList contains Ntdra elements, and each element corresponds to a row of the PDSCH TDRA table T. That is, the PDSCH TDRA table T contains Ntdra rows.

One element in the PDSCH-TimeDomainResourceAllocationList can contain the SLIV, the PDSCH mapping type and K0 of one or more PDSCHs. Accordingly, one row of PDSCH TDRA table T may contain the SLIV, the PDSCH mapping type and K0 of one or more PDSCHs. When the number of PDSCHs contained in one element in the PDSCH-TimeDomainResourceAllocationList is greater than 1, the SLIV, the PDSCH mapping type and K0 of each PDSCH in the element are respectively indicated. A downlink DCI format indicates the time resources of Np PDSCHs scheduled by the DCI by indicating the row index of the PDSCH TDRA table T. If the time domain resource of one of the Np PDSCHs overlaps with at least one of the uplink symbols configured semi-statically (configured by higher layer signaling)(for example, uplink symbols configured by the 3GPP parameter tdd-UL-DL-ConfigurationCommon or tdd-UL-DL-ConfigurationDedicated), the UE does not receive the PDSCH. The UE can consider that the base station did not transmit the PDSCH. The mapping type in one row of the TDRA table T is specified by a protocol or configured by higher layer signaling to be the same.

It should be noted that in the embodiments of the disclosure, a valid PDSCH may be a PDSCH that the time domain resource of the PDSCH does not overlap with any of the symbols of T. The valid PDSCH may be a PDSCH that the time domain resource of the PDSCH does not overlap with a first predefined time unit, where the first predefined time unit may be specified by a protocol and/or configured by higher layer signaling. In an embodiment, the first predefined time unit may be a first predefined symbol, for example, the first predefined symbol may be an uplink symbol configured semi-statically (configured by higher layer signaling) (for example, an uplink symbol configured by the 3GPP parameter tdd-UL-DL-ConfigurationCommon or TDD-UL-DL-ConfigurationDedicated). The UE can receive the valid PDSCH. An invalid PDSCH (not valid PDSCH) may be a PDSCH that the time domain resource of the PDSCH overlaps with at least one of the first predefined symbols. The UE may not receive and/or not expect to receive the invalid PDSCH. One valid/invalid PDSCH can be one of the multiple PDSCHs (corresponding to multiple TBs) scheduled by a DCI format, or one of the repeated transmissions of a PDSCH (corresponding to a TB). Unless otherwise specified, a PDSCH can be a valid PDSCH and/or an invalid PDSCH. For example, the first PDSCH may be the first valid PDSCH and/or the first invalid PDSCH. The last PDSCH may be the last valid PDSCH and/or the last invalid PDSCH.

In some implementations, it can be specified by a protocol and/or configured by higher layer signaling that, if a TDRA row indicated by a downlink DCI format contains multiple PDSCH SLIVs (scheduling multiple PDSCHs), the HARQ process ID indicated by the downlink DCI format applies to the first PDSCH, the HARQ process ID is then incremented by 1 for each subsequent PDSCH (for example, the PDSCH can be a valid PDSCH) in the scheduled sequence, with modulo operation applied to Nharqdl (for example, modulo 18 by 16, resulting in 2). Wherein Nharqdl can be a positive integer, and Nharqdl can be specified by a protocol and/or configured by higher layer signaling. Nharqdl can be determined by predefined methods. The first PDSCH may be the first valid PDSCH, or the first PDSCH may be the first PDSCH among the multiple PDSCH SLIVs, and the UE does not expect the first PDSCH among the multiple PDSCH SLIVs to overlap with the first predefined symbol (the UE does not expect the first PDSCH to be an invalid PDSCH). In this way, the UE's understanding of HARQ process ID can be clarified, the consistency of understanding between the UE and the base station can be ensured, and the reliability of downlink transmission can be improved. It should be noted that this method is also applicable to the scenario of scheduling multiple PUSCHs by a DCI format, for example, by replacing the PDSCH in this method with the PUSCH.

In some implementations, it can be specified by a protocol or configured by higher layer signaling that, the HARQ-ACK for Np PDSCHs scheduled by one downlink DCI format can be transmitted in a same uplink time unit. If the TDRA row indicated by one downlink DCI format contains multiple PDSCH SLIVs, the K1 (dl-DataToUL-ACK) field in the downlink DCI format is used to indicate the time unit interval (e.g., a slot/subslot offset) from the last valid PDSCH among the multiple PDSCH SLIVs to the PUCCH. This can improve the flexibility of K1 indication and reduce the HARQ-ACK feedback delay. Or K1 in the downlink DCI format is used to indicate the time unit interval from the last PDSCH in the TDRA row to the PUCCH. This is easy to implement and can reuse existing methods.

Figure 7:
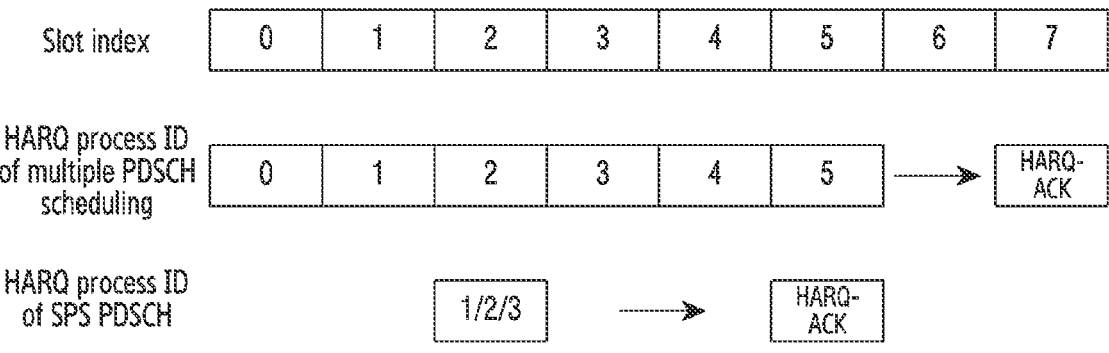
FIG. 7 illustrates an example of the relationship among slot indexes, HARQ process ID of multiple PDSCHs scheduling, and HARQ process ID of a semi-persistent scheduling (SPS) PDSCH according to various embodiments of the present disclosure.

In some implementations, for a given HARQ process, a protocol may specify the constraints of PDSCH scheduling. For example, 3GPP specifies that, the UE is not expected to receive another PDSCH for a given HARQ process until after the end of the expected transmission of HARQ-ACK for that HARQ process. When multiple PDSCHs can be scheduled by a DCI format, if the UE is configured to receive a SPS PDSCH within the duration of the multiple PDSCHs, scheduling a HARQ process available to multiple PDSCHs may be very limited due to the restriction of the same HARQ process scheduling. As shown in FIG. 7, a SPS PDSCH is configured to be received in slot 2, and the corresponding HARQ-ACK is transmitted in slot 5. The UE is scheduled by a DCI format indicating six PDSCH receptions from slot 0 to slot 5, and the corresponding HARQ-ACK is transmitted in slot 7. The PDSCH scheduled by DCI in slot 2 does not overlap with the SPS PDSCH in time domain (the occupied OFDM symbols are different). For example, when the HARQ process of the SPS PDSCH is 1, 2 or 3, the scheduling restriction of the same HARQ process specified in 3GPP cannot be satisfied, and the base station cannot perform such scheduling. This restriction may be even more severe when the number of configured SPS PDSCHs is large. To solve this problem, one method is to specify by a protocol that this restriction is only applicable to the scenario where a DCI format schedules a PDSCH, but not applicable to the scenario where a DCI format schedules multiple PDSCHs. This method is easy to implement and can reduce the complexity of the UE and the base station implementation. To solve this problem, other methods of the disclosure can also be adopted.

In some implementations, a protocol may specify the constraints of PDSCH scheduling. For example, 3GPP specified that a PDSCH reception and the corresponding HARQ-ACK feedback may follow the rule of first receiving and first feeding back. For example, in a given scheduled cell, the UE does not expect to receive the first PDSCH in slot i, its corresponding HARQ-ACK is allocated for transmission in slot j, and the second PDSCH starts after the first PDSCH, and its corresponding HARQ-ACK is allocated for transmission in a slot before the slot j. When multiple PDSCHs can be scheduled by a DCI format, if the UE is configured to receive a SPS PDSCH within the duration of the multiple PDSCHs, scheduling a HARQ process available to multiple PDSCHs may be very limited due to the restriction of the same HARQ process scheduling. To solve this problem, one method is to specify by a protocol that this restriction is only applicable to the scenario where a DCI format schedules a PDSCH, but not applicable to the scenario where a DCI format schedules multiple PDSCHs. This method is easy to implement and can reduce the complexity of the UE and base station implementation. To solve this problem, other methods of the disclosure can also be adopted.

To solve these problems above, at least one of the following methods can also be adopted.

Example 1: it can be specified by a protocol and/or configured by higher layer signaling that, for a serving cell, when (if) the first predefined condition is satisfied, the UE does not receive (does not expect to receive) a SPS PDSCH. The first predefined condition may be at least one of the following conditions.

Condition 1: the TDRA row indicated by a DCI format received by the UE (scheduling the UE) contains multiple PDSCH SLIVs (scheduling multiple PDSCHs).

Condition 2: the SPS PDSCH is configured to be received between the first PDSCH (e.g., starting/ending symbol (position) of the first PDSCH) and the last PDSCH (e.g., starting/ending symbol (position) of the last PDSCH) among the multiple PDSCHs (e.g., multiple PDSCHs scheduled by a DCI format).

Condition 3: the SPS PDSCH is configured to be received between the PDCCH carrying DCI (for example, starting/ending symbol (position) of the PDCCH) and the last PDSCH (for example, the starting/ending symbol (position) of the last PDSCH).

Condition 4: a PDCCH carrying a DCI format and the SPS PDSCH satisfy predefined timing relationship. For example, the predefined timing relationship may be that the starting/ending symbol (time instance) of the PDCCH is earlier than the starting/ending symbol (time instance) of the SPS PDSCH (for example, N1 may be 14 symbols) by N1 symbols, and N1 is specified by a protocol and/or configured by higher layer signaling.

Condition 5: the SPS PDSCH overlaps with a valid PDSCH scheduled by a DCI format in time domain.

Condition 6: the SPS PDSCH overlaps with a PDSCH scheduled by a DCI format (for example, the PDSCH can be a valid PDSCH and/or an invalid PDSCH) in time domain.

Condition 7: the HARQ process of the SPS PDSCH is the same as at least one of the HARQ processes of the multiple PDSCHs scheduled by a DCI format.

Condition 8: the SPS PDSCH reception and the corresponding HARQ-ACK feedback and at least one of the PDSCHs scheduled by a DCI format do not satisfy the rule of first receiving and first feeding back. For example, the SPS PDSCH reception and the corresponding HARQ-ACK feedback are not in the same time unit as the HARQ-ACK feedback of the multiple PDSCHs scheduled by a DCI format. For example, the SPS PDSCH reception is before at least one PDSCH among the multiple PDSCHs scheduled by a DCI format (for example, the starting symbol/position of the PDSCH can be used as a reference point for comparison), and the time unit where the HARQ-ACK information for the SPS PDSCH reception is located is after the time unit where the HARQ-ACK information for the at least one PDSCH is located. Or the SPS PDSCH reception is after at least one PDSCH among the multiple PDSCHs scheduled by a DCI format, the time unit where HARQ-ACK information for the SPS PDSCH reception is located is before the time unit where HARQ-ACK information for the at least one PDSCH is located.

The method can improve the flexibility of dynamic scheduling and the spectrum efficiency of the system. It should be noted that this method can also be applied to uplink scheduling. For example, the PDSCH in this method is replaced by the PUSCH, and the SPS PDSCH in this method is replaced by the CG PUSCH.

Example 2: it can be specified by a protocol and/or configured by higher layer signaling that, when (if) multiple PDSCH SLIVs (scheduling multiple PDSCHs) are contained in a TDRA row indicated by a DCI format received by the UE (scheduling the UE), the HARQ process ID indicated by the downlink DCI format applies to the first PDSCH, and the HARQ process ID is then incremented by 1 for each subsequent PDSCH (for example, the PDSCH can be a valid PDSCH) in the scheduled sequence, with modulo operation applied to Nharqdl. When incrementing the HARQ process, a HARQ process satisfying the second predefined condition can be skipped. For example, the DCI format indicates that the HARQ process of the first PDSCH is 0, the HARQ processes satisfying the second predefined condition are 1, 2, and the HARQ process of the second PDSCH is 3, where 1 and 2 are skipped. The second predefined condition may be at least one of the following conditions.

Condition 9: the HARQ process is configured as a HARQ process available for a SPS PDSCH configuration.

Condition 10: the HARQ process is a first specific HARQ process configured by higher layer signaling, for example, a HARQ process unavailable when scheduling multiple PDSCHs.

Condition 11: the HARQ process corresponding to a SPS PDSCH does not overlap with PDSCHs scheduled by a DCI format in time domain.

Condition 12: the HARQ process corresponding to the SPS PDSCH satisfies condition 2 and/or condition 3.

Nharqdl may be the maximum number of downlink available HARQ processes specified by a protocol and/or configured by higher layer signaling. For example, it can be configured by the 3GPP parameter nrofHARQ-Processes-ForPDSCH.

The method can avoid the conflict between HARQ processes of a dynamically scheduled PDSCH and a SPS PDSCH, and improve the scheduling flexibility. It should be noted that this method can also be applied to uplink scheduling. For example, the PDSCH in this method is replaced by the PUSCH, and the SPS PDSCH in this method is replaced by the CG PUSCH.

In some implementations, the method of preempting a SPS PDSCH by a PDSCH scheduled by a DCI format can be specified by a protocol. For example, if a PDSCH scheduled by a DCI format overlaps with a SPS PDSCH in time domain, the ending position (symbol) of the PDCCH carrying the DCI format is earlier than the starting symbol (position) of the SPS PDSCH by at least N1 (N1 can be a positive integer, for example, N1 is equal to 14) OFDM symbols, and the UE may receive (decode) the PDSCH scheduled by the DCI format, but may not receive (decode) the SPS PDSCH. If a DCI format can schedule multiple PDSCHs, it can be specified by a protocol that when a SPS PDSCH overlaps with a valid PDSCH in time domain, and the PDCCH carrying the DCI format and the SPS PDSCH satisfy predefined timing relationship, the UE receives (decodes) the valid PDSCH. The predefined timing relationship may be the timing relationship defined in the embodiments of the disclosure. This method avoids the situation that UE does not receive a SPS PDSCH when the SPS PDSCH overlaps with an invalid PDSCH scheduled by a DCI format, and can improve the spectrum efficiency of the system.

In some implementations, the UE is configured with dynamic HARQ-ACK codebook or an enhanced dynamic HARQ-ACK codebook. If the TDRA row indicated by a DCI format received by the UE (scheduling the UE) contains multiple PDSCH SLIVs (scheduling multiple PDSCHs), how to determine the number of bits (Nharq-ack) and the order of the HARQ-ACK codebook for the DCI is a problem to be solved.

In some implementations, the number of bits of the HARQ-ACK codebook can be configured by higher layer signaling and/or specified by predefined methods. For example, if the HARQ-ACK for PDSCH(s) scheduled by a DCI format is not transmitted in a same time unit (e.g., a slot/subslot) as the HARQ-ACK scheduled (indicated) by other DCI formats, Nharq-ack is the number of PDSCH SLIVs multiplied by X. Or Nharq-ack is the number of valid PDSCHs among the multiple PDSCH SLIVs multiplied by X. Wherein X is the number of HARQ-ACK bits corresponding to each PDSCH. For example, when a PDSCH contains only one TB, X is 1. When a PDSCH contains 2 TBs, and the UE is not configured to perform bundling operation for the 2 TBs (for example, the UE is not configured with the 3GPP parameter harq-ACK-SpatialBundling-PUCCH or harq-ACK-SpatialBundlingPUSCH configuration), X is 2. The number of HARQ-ACK bits determined by this method is different from when HARQ-ACK scheduled (indicated) by other DCIs is multiplexed. When HARQ-ACK is multiplexed, the number of HARQ-ACK bits corresponding to each DCI scheduling multiple PDSCHs is the same in general, so as to ensure the consistency of the understanding of HARQ-ACK codebook by the UE and base station when DCI is miss-detected. This method can reduce the number of bits of HARQ-ACK, improve the reliability of HARQ-ACK transmission and improve the spectrum efficiency of the system in the scenario where HARQ-ACK is not multiplexed with HARQ-ACK scheduled (indicated) by other DCIs.

Figure 8:
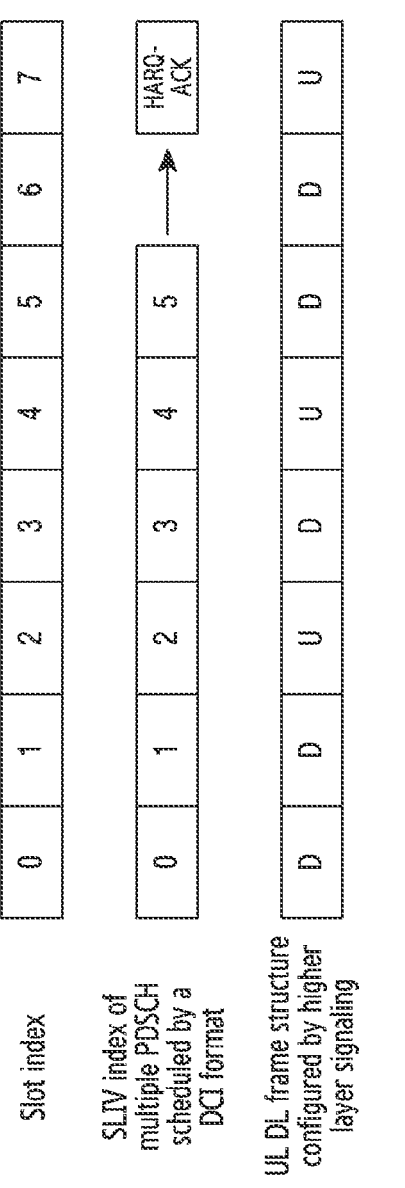
FIG. 8 illustrates an example of the relationship among slot indexes, start and length indicator value (SLIV) of multiple PDSCHs scheduling scheduled by DCI, and uplink and downlink frame structures configured by higher layer signaling according to various embodiments of the present disclosure.

In some implementations, it can be specified by a protocol and/or configured by higher layer signaling that the maximum number of HARQ-ACK bits corresponding to a DCI format is Nharq-ack-max, and each PDSCH among the multiple PDSCH SLIVs corresponds to X bits of HARQ-ACK information. HARQ-ACK information is arranged according to the sequence of PDSCH SLIV time, if the number of HARQ-ACK bits for PDSCHs scheduled by a DCI format is less than Nharq-ack-max, NACK can be padded after the HARQ-ACK bits for the scheduled PDSCHs until the number of HARQ-ACK bits equals Nharq-ack-max. For example, as shown in FIG. 8, the UE receives a DCI format, which indicates that six PDSCH SLIVs are respectively in slot 0 to slot 5, where slot 2 and slot 4 are uplink slots, and PDSCH SLIVs 0, 1, 3, and 5 are valid PDSCHs. Nharq-ack-max is configured by higher layer signaling as 8. The UE generates 8-bit HARQ-ACK for the PDSCHs scheduled by the DCI format, as shown in FIG. 9A. X equals 1. Wherein, A/N represents ACK/NACK, UE successfully decoding a PDSCH corresponds to ACK, and UE not successfully decoding a PDSCH corresponds to NACK. HARQ-ACK bit indexes 3, 5, 6, and 7 are reserved NACK bits. This method clarifies the bit sequence of HARQ-ACK, so that the understanding of the HARQ-ACK codebook by the UE and the base station can be kept consistent, and the reliability of HARQ-ACK transmission can be improved.

In some implementations, it can be specified by a protocol and/or configured by higher layer signaling that each valid PDSCH among the multiple PDSCH SLIVs corresponds to X bits of HARQ-ACK. HARQ-ACK information is arranged according to the sequence of the valid PDSCH SLIV time. If the number of HARQ-ACK bits for valid PDSCHs scheduled by a DCI format is less than Nharq-ack-max, NACK can be padded after the HARQ-ACK bits for the valid PDSCHs scheduled until the number of HARQ-ACK bits equals Nharq-ack-max. For example, for the example shown in FIG. 8, the HARQ-ACK bit sequence is as shown in FIG. 9B. X equals 1. The last four HARQ-ACK bits are reserved NACK bits. This method clarifies the bit sequence of HARQ-ACK, so that the understanding of the HARQ-ACK codebook by the UE and the base station can be kept consistent, and the reliability of HARQ-ACK transmission can be improved. When the HARQ-ACK for PDSCHs scheduled by the DCI format is not multiplexed with the HARQ-ACK scheduled (indicated) by other DCIs, the UE may not transmit the reserved bits. This method can reduce the number of HARQ-ACK bits in this scenario.

In some implementations, the UE is configured with dynamic HARQ-ACK codebook. If the UE is configured to be able to receive multiple PDSCH receptions scheduled by a DCI, or the UE detects that a DCI format schedules multiple PDSCH receptions, the HARQ-ACK codebook consists of two HARQ-ACK sub-codebooks. Wherein, the first HARQ-ACK sub-codebook includes HARQ-ACK information for the following PDSCH and/or PDCCH:

a PDSCH reception scheduled by a DCI format. The DCI format only schedules this PDSCH;

a SPS PDSCH reception; and a PDCCH without scheduling a PDSCH.

The second HARQ-ACK sub-codebook includes HARQ-ACK information for multiple PDSCH receptions scheduled by a DCI format. That is, the second HARQ-ACK sub-codebook is based on the DCI format that can schedule multiple PDSCH receptions.

In the second HARQ-ACK sub-codebook, the UE generates $$N_{HARQ-ACK}^{max}$$

HARQ-ACK information bits for each DCI format.

$$N_{HARQ-ACK}^{max}$$

is the maximum value of $$N_{TB,c}^{DL} * N_{PDSCH,c}^{max}$$

on all serving cells. Wherein, $$N_{TB,c}^{DL}$$

is the maximum number of TBs that a PDSCH can contain on a serving cell c, and $$N_{PDSCH,c}^{max}$$

is the maximum number of PDSCHs that can be scheduled by a DCI format on the serving cell c. For the serving cell c, if the UE detects that the number of PDSCHs scheduled by a DCI format is less than $$N_{HARQ-ACK}^{max} / N_{TB,c}^{DL},$$

the UE generates NACK for the last $$N_{HARQ-ACK}^{max} - N_{TB,c}^{DL} * N_{PDSCH,c}^{max}$$

HARQ-ACK information bits or the UE generates NACK for the last $$N_{HARQ-ACK}^{max} - N_{TB,c,i}^{DL} * N_{PDSCH,c}^{max}$$

HARQ-ACK information bits. Wherein, $$N_{TB,c,i}^{DL}$$

is the number of TBs contained in a PDSCH scheduled by the DCI format.

Optionally, the second HARQ-ACK sub-codebook is not applicable to the scenario where the 3GPP parameter harq-ACK-SpatialBundlingPUCCH is configured.

The first HARQ-ACK sub-codebook may be located before or after the second HARQ-ACK sub-codebook.

This method clarifies the bit information of the HARQ-ACK codebook and improves the reliability of HARQ-ACK transmission.

In some implementations, it can be specified by a protocol and/or configured by higher layer signaling that, if a TDRA row indicated by a downlink DCI format contains multiple PDSCH SLIVs (scheduling multiple PDSCHs), the bundling operation can be performed in time domain. At least one of the following approaches can be adopted.

Approach 1: the UE is configured with the number Nb of HARQ-ACK bundling groups corresponding to a DCI format. Multiple PDSCH SLIVs scheduled by a DCI format can be allocated to Nb groups according to predefined rules (for example, average allocation). Or multiple valid PDSCH SLIVs scheduled by a DCI format can be allocated to Nb groups according to predefined rules (for example, average grouping). For example, the method of dividing code blocks (CBs) in one TB into code block groups (CBGs) defined by 3GPP can be adopted. The UE can perform bundling operation on the HARQ-ACK information corresponding to the valid PDSCH SLIVs in each group. For example, if all HARQ-ACK bits are ACK, the bundled bit is ACK; if at least one of all HARQ-ACK bits is NACK, the bundled bit is NACK. For example, as shown in the example of FIG. 8, Nb is equal to 2, and grouping is performed according to the valid PDSCH SLIVs. The SLIVs in the first group are 0, 1, and the SLIVs in the second group are 3, 5. By grouping according to the valid SLIVs, the grouping of the actually transmitted PDSCHs can be more even.

Approach 2: the UE is configured with the maximum number Npb of PDSCHs in one HARQ-ACK bundling group corresponding to a DCI format. The number of HARQ-ACK bits corresponding to a DCI format can be determined by dividing the number of PDSCH SLIVs scheduled by the DCI format by Npb. The UE can perform bundling operation on the HARQ-ACK information corresponding to the valid PDSCH SLIVs in each group. If a non-integer is resulted, rounding operation, such as rounding up can be performed. For example, as shown in the example in FIG. 8, Npb is equal to 4, the number of PDSCH SLIVs is 6, 6 divided by 4 equals 1.5, and rounded up to 2. There are two groups, the SLIVs in the first group are 0, 1, 2, and 3, and the bundling operation is performed on SLIVs 0, 1 and 3; the SLIVs in the second group are 4 and 5, and the bundling operation is performed on SLIV5.

Approach 3: the UE is configured with the maximum number Npb of valid PDSCHs in one HARQ-ACK bundling group corresponding to a DCI format. The number of HARQ-ACK bits corresponding to a DCI format can be determined by dividing the number of valid PDSCH SLIVs scheduled by the DCI format by Npb. If a non-integer is resulted, rounding operation, such as rounding up can be performed. The UE can perform bundling operation on the HARQ-ACK information corresponding to the valid PDSCH SLIVs in each group. For example, as shown in the example in FIG. 8, Npb is equal to 4, the number of valid PDSCH SLIVs is 4, and 4 divided by 4 equals 1. There is one group with SLIVs of 0, 1, 3, and 5, and the bundling operation is performed on SLIVs 0, 1, 3, and 5. This method can reduce the number of bundling groups, thereby reducing the number of HARQ-ACK bits and improving the reliability of HARQ-ACK transmission.

Approach 4: the UE is configured with a PDSCH duration corresponding to one HARQ-ACK bundling group corresponding to a DCI format, and the UE can perform bundling operation on the HARQ-ACK information corresponding to the valid PDSCH SLIVs in this duration. For example, as shown in the example of FIG. 8, the PDSCH has a duration of 4 slots and there are two groups. The SLIVs in the first group are 0, 1, 2, and 3, and the SLIVs in the second group are 4 and 5.

This method defines the method for performing bundling operation on PDSCHs, which can reduce HARQ-ACK information bits and improve the reliability of HARQ-ACK transmission.

In some implementations, one uplink DCI format can schedule 1 or Np PUSCHs. Where Np is an integer greater than 1. The base station can configure a PUSCH TDRA table T for the UE to determine the possible time resources of a PUSCH. A row in the table T may indicate the time resource information of one or more PUSCHs. The time resource information of each PUSCH includes SLIV, K2, and PUSCH mapping type. For example, the base station con- figures the time domain resource allocation list of PUSCH (corresponding to the PUSCH TDRA table T), for example, configures the list by PUSCH-TimeDomainResourceAllo-cationList. The PUSCH-TimeDomainResourceAllocation-List contains Ntdra elements, and each element corresponds to a row of the PUSCH TDRA table T. That is, the PUSCH TDRA table T contains Ntdra rows. One element in PUSCH-TimeDomainResourceAllocationList can contain a SLIV, a PUSCH mapping type and K2 of one or more PUSCHs.

Accordingly, one row of the PUSCH TDRA table T may contain the SLIV, the PUSCH mapping type and K2 of one or more PUSCHs. When the number of PUSCHs contained in one element in the PUSCH-TimeDomainResourceAllo-cationList is greater than 1, the SLIV, the PUSCH mapping type and K2 of each PUSCH in the element are respectively indicated. The uplink DCI format indicates the time resources of Np PDSCHs scheduled by the DCI by indicat-ing the row index of the PUSCH TDRA table T. If the time domain resource of one of the Np PUSCHs overlaps with at least one of the second predefined time units, the UE does not transmit the PUSCH. In an embodiment, the second predefined time units may be second predefined symbols, wherein the second predefined symbols may be specified by a protocol and/or configured by higher layer signaling. For example, the second predefined symbols may be at least one of the followings:

downlink symbols configured semi-statically (configured by higher layer signaling)(for example, downlink sym-bols configured by 3GPP parameter tdd-UL-DL-Con-figurationCommon or tdd-UL-DL-Configuration Dedi-cated);
symbols of the synchronization signal block (SSB);
symbols of CORESET0;
unavailable symbols configured by higher layer signaling; and
Y symbols after the SSB. Where Y is an integer, which can be specified by a protocol and/or configured by higher layer signaling.
In the embodiments of the disclosure, a valid PUSCH may be a PUSCH that the time domain resource of the PUSCH does not overlap with any of the second predefined symbols. An invalid PUSCH (not valid PUSCH) may be a PU SCH that the time domain resource of the PUSCH overlaps with at least one of the second predefined symbols. For example, it can be specified by a protocol that a PUSCH that the UE can transmit is a valid PUSCH, and a PUSCH that the UE does not transmit and/or does not expect to transmit is an invalid PUSCH. One valid (or invalid) PUSCH can be one of the multiple PUSCHs (corresponding to multiple TBs) scheduled by a DCI format, or one of the repeated PUSCH transmissions (corresponding to one TB). Unless otherwise specified, a PUSCH can be a valid PUSCH and/or an invalid PUSCH. For example, the first PUSCH may be the first valid PUSCH and/or the first invalid PUSCH. The last PUSCH can be the last valid PUSCH and/or the last invalid PUSCH. It can be specified by a protocol and/or configured by higher layer signaling that, the mapping types in one row of the TDRA table T are the same.

In some implementations, it can be specified by a protocol and/or configured by higher layer signaling that, if a TDRA row indicated by one uplink DCI format contains multiple PUSCH SLIVs (scheduling multiple PUSCHs), the HARQ process ID indicated by the uplink DCI format applies to the first PUSCH, and the HARQ process ID is then incremented by 1 for each subsequent PUSCH (for example, a PUSCH can be a valid PUSCH) in the scheduled sequence, with modulo operation applied to Nharqul. Wherein Nharqul is a positive integer, and Nharqul can be specified by a protocol and/or configured by higher layer signaling. For example, Nharqul may be the maximum number of HARQ processes available for uplink transmission specified by a protocol and/or configured by higher layer signaling. Nharqul can be determined by predefined methods. The first PUSCH may be the first valid PUSCH (for example, a PUSCH that does not overlap with the second predefined symbols), or the first PUSCH may be the first PUSCH among the multiple PUSCH SLIVs, and the UE does not expect the first PUSCH among the multiple PUSCH SLIVs to overlap with the second predefined symbols. In this way, the UE's under-standing of HARQ process ID can be clarified, the consis-tency of understanding between the UE and base station can be ensured, and the reliability of uplink transmission can be improved.

In some implementations, if a TDRA row indicated by one uplink DCI format contains multiple PUSCH SLIVs (scheduling multiple PUSCHs), similar to the downlink scheduling, the uplink scheduling may also have the prob-lem that the HARQ process of the dynamically scheduled PUSCH conflicts with the HARQ process of a CG PUSCH. To solve these problems, at least one of the following methods can be adopted.

Example 3: it can be specified by a protocol and/or configured by higher layer signaling that, for a serving cell, when (if) the third predefined condition is satisfied, no MAC PDU may be generated for the CG PUSCH. The third predefined condition may be at least one of the following conditions.

Condition 13: the TDRA row indicated by a DCI format received by the UE (scheduling the UE) contains multiple PUSCH SLIVs (scheduling multiple PUSCHs).
Condition 14: the CG PUSCH is configured to be received between the first PUSCH (e.g., the starting/ending symbol (position) of the first PUSCH) and the last PUSCH (e.g., the starting/ending symbol (position) of the last PUSCH) among the multiple PUSCHs (e.g., the multiple PUSCHs scheduled by a DCI format).
Condition 15: the CG PUSCH is configured to be received between the PDCCH (e.g., the starting/ending symbol (position) of the PDCCH) carrying DCI and the last PUSCH (e.g., the starting/ending symbol (position) of the last PUSCH).
Condition 16: a PDCCH carrying a DCI format and the CG PUSCH satisfy predefined timing relationship. For example, the predefined timing relationship may be that the starting/ending symbol (time instance) of the PDCCH is earlier than the starting/ending symbol (time instance) of the CG PUSCH by N2 symbols. N2 can be specified by a protocol and/or configured by higher layer signaling.
Condition 17: the CG PUSCH does not overlap with a PUSCH scheduled by a DCI format (for example, the PUSCH can be a valid PUSCH and/or an invalid PUSCH) in time domain.
Condition 18: the HARQ process of the CG PUSCH is the same as at least one of the HARQ processes of the multiple PUSCHs scheduled by a DCI format.
Example 4: it can be specified by a protocol and/or configured by higher layer signaling that, if a TDRA row indicated by an uplink DCI format contains multiple PUSCH SLIVs (scheduling multiple PUSCHs), when determining the HARQ processes of the PUSCHs subsequent to the first PUSCH, the HARQ process satisfying a fourth predefined condition can be skipped when incrementing the HARQ process. The fourth predefined condition may be at least one of the following conditions.

Condition 19: the HARQ process is configured as a HARQ-ACK process available for a CG PUSCH configuration.

Condition 20: the HARQ process is a second specific HARQ process configured by higher layer signaling, for example, a HARQ process unavailable when scheduling multiple PUSCHs.

Condition 21: the HARQ process corresponding to a CG PUSCH does not overlap with PUSCHs scheduled by a DCI format in time domain.

Condition 22: the HARQ process corresponding to a CG PUSCH satisfies condition 14 and/or condition 15.

This method can avoid the conflict between HARQ processes of dynamically scheduled PDSCH and SPS PDSCH, and improve the scheduling flexibility.

In some implementations, it can be specified by a protocol and/or configured by higher layer signaling that, if a TDRA row indicated by one uplink DCI format contains multiple PUSCH SLIVs (scheduling multiple PUSCHs), if a PUCCH overlaps with one of the PUSCHs in time domain, and if the PUSCH is a valid PUSCH, the UE multiplexes UCI information in the PUCCH to the PUSCH for transmission, and the UE does not transmit the PUCCH. The UE transmits the PUCCH if the PUSCH is an invalid PUSCH. Or it can be specified by a protocol that when a PUCCH overlaps with a PUSCH in time domain, the invalid PUSCH may be excluded first. Or the multiplexing of a PUCCH and a PUSCH only applies to a valid PUSCH. For example, one of the valid PUSCHs can be selected according to the method defined by 3GPP for transmission of the UCI. This method can prevent the UE from multiplexing UCI information to an invalid PUSCH, and can improve the reliability of UCI transmission and the spectrum efficiency of the system. This method is also applicable to CG PUSCH transmission.

Figure 10:
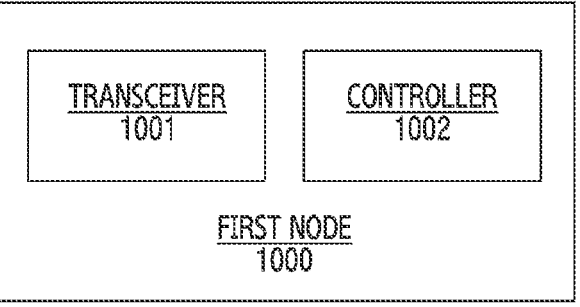
FIG. 10 illustrates a block diagram of a first node 1000 according to various embodiments of the present disclosure.

FIG. 10 illustrates a block diagram of a first node 1000 according to various embodiments of the present disclosure.

Referring to FIG. 10, the first node 1000 may include a transceiver 1001 and a controller 1002.

The transceiver 1001 may be configured to transmit the first data and/or the first control signaling to the second node and receive the second data and/or the second control signaling from the second node in a time unit.

The controller 1002 may be an application specific integrated circuit or at least one processor. The controller 1002 may be configured to control the overall operation of the first node, including controlling the transceiver 1001 to transmit the first data and/or the first control signaling to the second node and to receive the second data and/or the second control signaling from the second node in a time unit.

In some implementations, the controller 1002 may be configured to perform one or more operations in the methods of various embodiments described above.

In the following description, the first node as a base station is taken as an example (but not limited to) for illustration, and the second node as a UE is taken as an example (but not limited to) for illustration. The first data and/or the first control signaling as downlink data and/or downlink control signaling is taken as an example (but not limited to) for illustration. The HARQ-ACK codebook may be included in the second control signaling, which is illustrated by the uplink control signaling (but not limited to).

Figure 11:
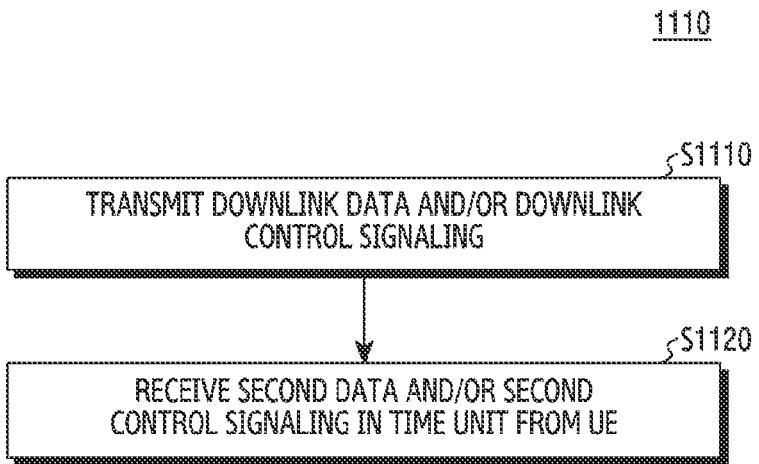
FIG. 11 illustrates a flowchart of a method 1100 performed by a base station according to various embodiments of the present disclosure.

FIG. 11 illustrates a flowchart of a method 1100 performed by a base station according to various embodiments of the present disclosure.

With reference to FIG. 11, in step S1110, the base station transmits downlink data and/or downlink control information.

At step S1120, the base station receives the second data and/or the second control information from the UE in a time unit.

For example, the method 1100 may include one or more of the operations performed by the base station described in various embodiments of the disclosure.

In some implementations, the downlink channel may include a PDCCH and/or a PDSCH. The uplink channel may include a PUCCH and/or a PUSCH.

Figure 12:
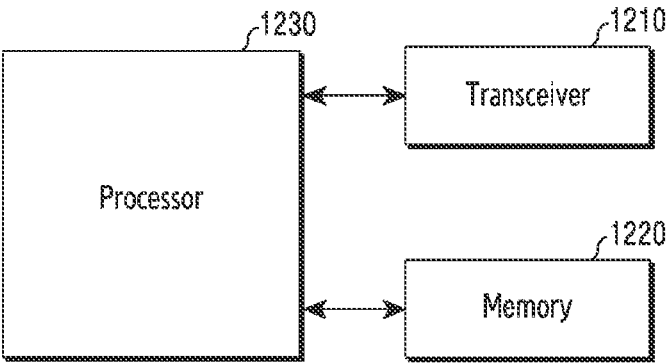
FIG. 12 illustrates a block diagram of a terminal (or a user equipment (UE)) according to various embodiments of the present disclosure.

FIG. 12 illustrates a block diagram of a terminal (or a user equipment (UE)), according to various embodiments of the present disclosure.

As shown in FIG. 12, a terminal according to an embodiment may include a transceiver 1210, a memory 1220, and a processor (or a controller) 1230. The transceiver 1210, the memory 1220, and the processor (or controller) 1230 of the terminal may operate according to a communication method of the terminal described above. However, the components of the terminal are not limited thereto. For example, the terminal may include more or fewer components than those described in FIG. 12. In addition, the processor (or controller) 1230, the transceiver 1210, and the memory 1220 may be implemented as a single chip. Also, the processor (or controller) 1230 may include at least one processor.

The transceiver 1210 collectively refers to a terminal station receiver and a terminal transmitter, and may transmit/receive a signal to/from a base station or another terminal. The signal transmitted or received to or from the terminal may include control information and data. The transceiver 1210 may include a RF transmitter for up-converting and amplifying a frequency of a transmitted signal, and a RF receiver for amplifying low-noise and down-converting a frequency of a received signal. However, this is only an example of the transceiver 1210 and components of the transceiver 1210 are not limited to the RF transmitter and the RF receiver.

Also, the transceiver 1210 may receive and output, to the processor (or controller) 1230, a signal through a wireless channel, and transmit a signal output from the processor (or controller) 1230 through the wireless channel.

The memory 1220 may store a program and data required for operations of the terminal. Also, the memory 1220 may store control information or data included in a signal obtained by the terminal. The memory 1220 may be a storage medium, such as read-only memory (ROM), random access memory (RAM), a hard disk, a CD-ROM, and a DVD, or a combination of storage media.

The processor (or controller) 1230 may control a series of processes such that the terminal operates as described above. For example, the processor (or controller) 1230 may receive a data signal and/or a control signal, and the processor (or controller) 1230 may determine a result of receiving the signal transmitted by the base station and/or the other terminal.

Figure 13:
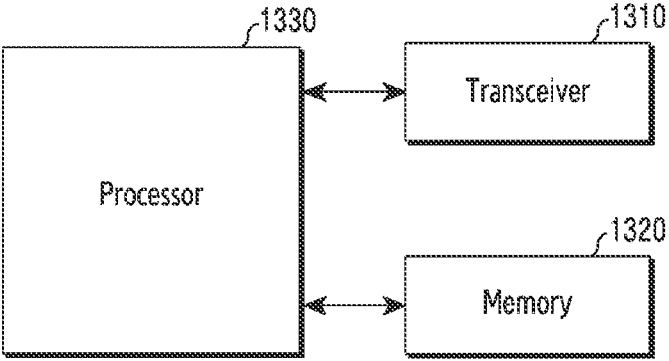
FIG. 13 illustrates a block diagram of a base station according to various embodiments of the present disclosure.

FIG. 13 illustrates a block diagram of a base station according to various embodiments of the present disclosure.

As shown in FIG. 13 is, the base station of the present disclosure may include a transceiver 1310, a memory 1320, and a processor (or, a controller) 1330. The transceiver 1310, the memory 1320, and the processor (or controller) 1330 of the base station may operate according to a communication method of the base station described above. However, the components of the base station are not limited thereto. For example, the base station may include more or fewer components than those described in FIG. 13. In addition, the processor (or controller)1330, the transceiver 1310, and the memory 1320 may be implemented as a single chip. Also, the processor (or controller)1330 may include at least one processor.

The transceiver 1310 collectively refers to a base station receiver and a base station transmitter, and may transmit/receive a signal to/from a terminal, another base station, and/or a core network function(s) (or entity(s)). The signal transmitted or received to or from the base station may include control information and data. The transceiver 1310 may include a RF transmitter for up-converting and amplifying a frequency of a transmitted signal, and a RF receiver for amplifying low-noise and down-converting a frequency of a received signal. However, this is only an example of the transceiver 1310 and components of the transceiver 1310 are not limited to the RF transmitter and the RF receiver.

Also, the transceiver 1310 may receive and output, to the processor (or controller) 1330, a signal through a wireless channel, and transmit a signal output from the processor (or controller) 1330 through the wireless channel.

The memory 1320 may store a program and data required for operations of the base station. Also, the memory 1320 may store control information or data included in a signal obtained by the base station. The memory 1320 may be a storage medium, such as ROM, RAM, a hard disk, a CD-ROM, and a DVD, or a combination of storage media.

The processor (or controller) 1330 may control a series of processes such that the base station operates as described above. For example, the processor (or controller) 1330 may receive a data signal and/or a control signal, and the processor (or controller) 1330 may determine a result of receiving the signal transmitted by the terminal and/or the core network function.

The methods according to the embodiments described in the claims or the detailed description of the present disclosure may be implemented in hardware, software, or a combination of hardware and software.

When the electrical structures and methods are implemented in software, a computer-readable recording medium having one or more programs (software modules) recorded thereon may be provided. The one or more programs recorded on the computer-readable recording medium are configured to be executable by one or more processors in an electronic device. The one or more programs include instructions to execute the methods according to the embodiments described in the claims or the detailed description of the present disclosure.

The programs (e.g., software modules or software) may be stored in random access memory (RAM), non-volatile memory including flash memory, read-only memory (ROM), electrically erasable programmable read-only memory (EEPROM), a magnetic disc storage device, compact disc-ROM (CD-ROM), a digital versatile disc (DVD), another type of optical storage device, or a magnetic cassette. Alternatively, the programs may be stored in a memory system including a combination of some or all of the above-mentioned memory devices. In addition, each memory device may be included by a plural number.

The programs may also be stored in an attachable storage device which is accessible through a communication network such as the Internet, an intranet, a local area network (LAN), a wireless LAN (WLAN), or a storage area network (SAN), or a combination thereof. The storage device may be connected through an external port to an apparatus according to the embodiments of the present disclosure. Another storage device on the communication network may also be connected to the apparatus performing the embodiments of the present disclosure.

In the afore-described embodiments of the present disclosure, elements included in the present disclosure are expressed in a singular or plural form according to the embodiments. However, the singular or plural form is appropriately selected for convenience of explanation and the present disclosure is not limited thereto. As such, an element expressed in a plural form may also be configured as a single element, and an element expressed in a singular form may also be configured as plural elements.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Those skilled in the art will understand that the above illustrative embodiments are described herein and are not intended to be limiting. It should be understood that any two or more of the embodiments disclosed herein can be combined in any combination. In addition, other embodiments can be utilized and other changes can be made without departing from the spirit and scope of the subject matter presented herein. It will be readily understood that aspects of the disclosed embodiments as generally described herein and shown in the drawings can be arranged, replaced, combined, separated and designed in various different configurations, all of which are contemplated herein.

Those skilled in the art will understand that various illustrative logical blocks, modules, circuits, and steps described in this application can be implemented as hardware, software, or combinations of both. To clearly illustrate this interchangeability between hardware and software, various illustrative components, blocks, modules, circuits, and steps are generally described above in the form of their functional sets. Whether such a function set is implemented as hardware or software depends on the specific application and the design constraints imposed on the overall system. Technicians can implement the described set of functions in different ways for each specific application, but such design decisions should not be interpreted as causing a departure from the scope of this application.

The various illustrative logic blocks, modules, and circuits described in this application can be implemented with a general purpose processor, a digital signal processor (DSP), an application specific integrated circuit (application specific integrated circuit), ASIC), a field programmable gate array (FPGA) or other programmable logic devices, discrete gate or transistor logic, discrete hardware components, or any combination thereof designed to perform the functions described herein. The general-purpose processor may be a microprocessor, but in the alternative, the processor may be any conventional processor, controller, microcontroller, or state machine. The processor can also be implemented as a combination of computing devices, such as a combination of a DSP and a microprocessor, multiple microprocessors, one or more microprocessors cooperating with a DSP core, or any other such configuration.

The steps of the method or algorithm described in this application can be directly embodied in hardware, in a software module performed by a processor, or in a combination of the two. The software modules may reside in RAM memory, flash memory, ROM memory, EPROM memory, EEPROM memory, registers, hard disks, removable disks, or any other form of storage media known in the art. An exemplary storage medium is coupled to the processor so that the processor can read and write information from/to the storage medium. In the alternative, the storage medium may be integrated into the processor. The processor and the storage medium may reside in the ASIC. The ASIC may reside in the user terminal. In the alternative, the processor and the storage medium may reside as discrete components in the user terminal.

In one or more exemplary designs, the functions can be implemented in hardware, software, firmware, or any combination thereof. If implemented in software, each function can be stored on or transmitted by a computer-readable medium as one or more instructions or codes. Computer readable media include both computer storage media and communication media, the latter including any media that facilitates the transfer of computer programs from one place to another. Storage media can be any available media that can be accessed by general-purpose or special-purpose computers.

The above flowchart illustrates example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

The above description is only an exemplary embodiment of the present disclosure, and is not intended to limit the scope of protection of the present disclosure, which is determined by the appended claims.

What is claimed is:

1. A method performed by a user equipment (UE) in a wireless communication system, the method comprising:
receiving, from a base station, downlink control information (DCI) scheduling a plurality of physical downlink shared channels (PDSCHs) on a cell, wherein the DCI indicates a hybrid automatic repeat request (HARQ) process identifier (ID);
receiving, from the base station, PDSCHs among the plurality of PDSCHs scheduled by the DCI; and
transmitting, to the base station, HARQ-acknowledgement (HARQ-ACK) information associated with the PDSCHs by applying the HARQ process ID indicated by the DCI to one PDSCH of the PDSCHs and incrementing the HARQ process ID by 1 for each subsequent PDSCH of the PDSCHs, wherein the one PDSCH is a first PDSCH in time domain which does not overlap with an uplink symbol,

wherein a PDSCH which overlaps with the uplink symbol in the time domain is not received from the base station, and the HARQ process ID is not incremented for the PDSCH which overlaps with the uplink symbol.

2. The method of claim 1, wherein the HARQ-ACK information includes N bits for HARQ bundling.

3. The method of claim 2, wherein the N bits are identified based on a reception of a PDSCH not overlapping with the uplink symbol.

4. The method of claim 1, wherein the uplink symbol is indicated by a common time division duplex uplink and downlink configuration (tdd-UL-DL-ConfigurationCommon) or a dedicated time division duplex uplink and downlink configuration (tdd-UL-DL-ConfigurationDedicated) received from the base station.

5. A method performed by a base station in a wireless communication system, the method comprising:
transmitting, to a user equipment (UE), downlink control information (DCI) scheduling a plurality of physical downlink shared channels (PDSCHs) on a cell, wherein the DCI indicates a hybrid automatic repeat request (HARQ) process identifier (ID); and
receiving, from the UE, HARQ-acknowledgement (HARQ-ACK) information associated with PDSCHs among the plurality of PDSCHs scheduled by the DCI, wherein the HARQ process ID indicated by the DCI is applied to one PDSCH of the PDSCHs and incremented by 1 for each subsequent PDSCH of the PDSCHs, and the one PDSCH is a first PDSCH in time domain which does not overlap with an uplink symbol, wherein the HARQ process ID is not incremented for a PDSCH which overlaps with the uplink symbol.

6. The method of claim 5, wherein the HARQ-ACK information includes N bits for HARQ bundling.

7. The method of claim 6, wherein the N bits indicate a result of a reception of a PDSCH not overlapping with the uplink symbol.

8. The method of claim 5, wherein the uplink symbol is indicated by a common time division duplex uplink and downlink configuration (tdd-UL-DL-ConfigurationCommon) or a dedicated time division duplex uplink and downlink configuration (tdd-UL-DL-ConfigurationDedicated) transmitted to the UE.

9. A user equipment (UE) comprising:
at least one transceiver;
at least one processor communicatively coupled to the at least one transceiver; and
at least one memory, communicatively coupled to the at least one processor, storing instructions executable by the at least one processor individually or in any combination to cause the UE to:
receive, from a base station, downlink control information (DCI) scheduling a plurality of physical downlink shared channels (PDSCHs) on a cell, wherein the DCI indicates a hybrid automatic repeat request (HARQ) process identifier (ID),
receive, from the base station, PDSCHs among the plurality of PDSCHs scheduled by the DCI, and
transmit, to the base station, HARQ-acknowledgement (HARQ-ACK) information associated with the PDSCHs by applying the HARQ process ID indicated by the DCI to one PDSCH of the PDSCHs and incrementing the HARQ process ID by 1 for each subsequent PDSCH of the PDSCHs, wherein the one PDSCH is a first PDSCH in time domain which does not overlap with an uplink symbol, wherein a PDSCH which overlaps with the uplink symbol in the time domain is not received from the base station, and the HARQ process ID is not incremented for the PDSCH which overlaps with the uplink symbol.

10. The UE of claim 9, wherein the HARQ-ACK information includes N bits for HARQ bundling.

11. The UE of claim 10, wherein the N bits are identified based on a reception of a PDSCH not overlapping with the uplink symbol.

12. The UE of claim 9, wherein the uplink symbol is indicated by a common time division duplex uplink and downlink configuration (tdd-UL-DL-ConfigurationCommon) or a dedicated time division duplex uplink and downlink configuration (tdd-UL-DL-ConfigurationDedicated) received from the base station.

13. A base station comprising:
   at least one transceiver;
   at least one processor communicatively coupled to the at least one transceiver; and
   at least one memory, communicatively coupled to the at least one processor, storing instructions executable by the at least one processor individually or in any combination to cause the base station to:
      transmit, to a user equipment (UE), downlink control information (DCI) scheduling a plurality of physical downlink shared channels (PDSCHs) on a cell, wherein the DCI indicates a hybrid automatic repeat request (HARQ) process identifier (ID), and
      receive, from the UE, HARQ-acknowledgement (HARQ-ACK) information associated with PDSCHs among the plurality of PDSCHs scheduled by the DCI, wherein the HARQ process ID indicated by the DCI is applied to one PDSCH of the PDSCHs and incremented by 1 for each subsequent PDSCH of the PDSCHs, and the one PDSCH is a first PDSCH in time domain which does not overlap with an uplink symbol,
   wherein the HARQ process ID is not incremented for a PDSCH which overlaps with the uplink symbol.

14. The base station of claim 13, wherein the HARQ-ACK information includes N bits for HARQ bundling.

15. The base station of claim 14, wherein the N bits indicate a result of a reception of a PDSCH not overlapping with the uplink symbol.

16. The base station of claim 13, wherein the uplink symbol is indicated by a common time division duplex uplink and downlink configuration (tdd-UL-DL-ConfigurationCommon) or a dedicated time division duplex uplink and downlink configuration (tdd-UL-DL-ConfigurationDedicated) transmitted to the UE.

* * * * *